(12) United States Patent  
Burd et al.

(10) Patent No.: US 7,415,524 B2
(45) Date of Patent: *Aug. 19, 2008

(54) POSTBACK INPUT HANDLING BY SERVER-SIDE CONTROL OBJECTS

(75) Inventors: Gary S. Burd, Kirkland, WA (US);
Kenneth B. Cooper, Seattle, WA (US);
Scott D. Guthrie, Redmond, WA (US);
David S. Ebbo, Redmond, WA (US);
Mark T. Anders, Bellevue, WA (US);
Ted A. Peters, Seattle, WA (US);
Stephen J. Millet, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 27 days.

This patent is subject to a terminal disclaimer.

(21) Appl. No.: 11/165,416

(22) Filed: Jun. 22, 2005

(65) Prior Publication Data

US 2006/0004910 A1 Jan. 5, 2006

Related U.S. Application Data

(63) Continuation of application No. 09/574,165, filed on May 18, 2000, now Pat. No. 7,013,340.

(51) Int. Cl.
*G06F 15/16* (2006.01)
*G06F 15/177* (2006.01)
(52) U.S. Cl. ...................... 709/229; 709/223
(58) Field of Classification Search ........... 709/229, 709/223, 203, 204
See application file for complete search history.

(56) References Cited

U.S. PATENT DOCUMENTS 3,937,925 A 2/1976 Boothroyd
3,956,615 A 5/1976 Anderson et al.

(Continued)

FOREIGN PATENT DOCUMENTS

EP 1156428 12/2000

(Continued)

OTHER PUBLICATIONS

Solomon, David A. "Inside Windows NT, Second Edition"; Microsoft Press 1998; pp. 310-319.

(Continued)

*Primary Examiner*—Larry D Donaghue
(74) *Attorney, Agent, or Firm*—Merchant & Gould, P.C.

(57) ABSTRACT

One or more server-side control objects provide server-side processing of postback input received from client-side user interface elements in a request from a client. Such input may include without limitation postback data and postback events generated from a web page on a client and received by a server in an HTTP request. A hierarchy of server-side control objects can cooperate to process the postback input and to generate the resulting authoring language code, such as HTML. Server-side events can also result from the server-side processing of postback input. In addition to processing postback input, server-side processing may include, without limitation, state management of server-side control objects and binding data to and from server-side database. After the processing and generating operations, the server-side control object hierarchy is terminated until a subsequent request is received from the client.

15 Claims, 9 Drawing Sheets

U.S. PATENT DOCUMENTS

| | | |
|---|---|---|
| 4,186,871 A | 2/1980 | Anderson et al. |
| 4,807,154 A | 2/1989 | Scully et al. |
| 4,847,785 A | 7/1989 | Stephens |
| 4,949,300 A | 8/1990 | Christenson et al. |
| 4,979,148 A | 12/1990 | Bush et al. |
| 5,093,778 A | 3/1992 | Favor et al. |
| 5,299,315 A | 3/1994 | Chin et al. |
| 5,339,424 A | 8/1994 | Fushimi |
| 5,349,657 A | 9/1994 | Lee |
| 5,375,242 A | 12/1994 | Kumar et al. |
| 5,388,156 A | 2/1995 | Blackledge, Jr. et al. |
| 5,434,992 A | 7/1995 | Mattson |
| 5,465,332 A | 11/1995 | Deloye et al. |
| 5,471,318 A | 11/1995 | Ahuja et al. |
| 5,517,655 A | 5/1996 | Collins et al. |
| 5,548,340 A | 8/1996 | Bertram |
| 5,550,560 A | 8/1996 | Kanada et al. |
| 5,577,253 A | 11/1996 | Blickstein |
| 5,604,908 A | 2/1997 | Mortson |
| 5,608,890 A | 3/1997 | Berger et al. |
| 5,613,117 A | 3/1997 | Davidson et al. |
| 5,638,176 A | 6/1997 | Hobbs et al. |
| 5,640,449 A | 6/1997 | Worley et al. |
| 5,649,131 A | 7/1997 | Ackerman et al. |
| 5,659,753 A | 8/1997 | Murphy et al. |
| 5,664,228 A | 9/1997 | Mital |
| 5,675,520 A | 10/1997 | Pitt, III et al. |
| 5,689,703 A | 11/1997 | Atkinson et al. |
| 5,706,505 A | 1/1998 | Fraley et al. |
| 5,727,159 A | 3/1998 | Kikinis |
| 5,732,256 A | 3/1998 | Smith |
| 5,732,267 A | 3/1998 | Smith |
| 5,745,103 A | 4/1998 | Smith |
| 5,748,890 A | 5/1998 | Goldberg et al. |
| 5,754,774 A | 5/1998 | Bittinger et al. |
| 5,764,235 A | 6/1998 | Hunt et al. |
| 5,764,236 A | 6/1998 | Tanaka |
| 5,764,873 A | 6/1998 | Magid et al. |
| 5,774,670 A | 6/1998 | Montulli |
| 5,793,982 A | 8/1998 | Shrader et al. |
| 5,802,600 A | 9/1998 | Smith et al. |
| 5,812,996 A | 9/1998 | Rubin et al. |
| 5,835,724 A | 11/1998 | Smith |
| 5,855,020 A | 12/1998 | Kirsch |
| 5,873,097 A | 2/1999 | Harris et al. |
| 5,878,141 A | 3/1999 | Daly et al. |
| 5,878,282 A | 3/1999 | Mital |
| 5,889,992 A | 3/1999 | Koerber |
| 5,892,937 A | 4/1999 | Caccavale |
| 5,897,622 A | 4/1999 | Blinn et al. |
| 5,897,644 A | 4/1999 | Nielsen |
| 5,911,068 A | 6/1999 | Zimmerman et al. |
| 5,911,145 A | 6/1999 | Arora et al. |
| 5,918,007 A | 6/1999 | Blackledge, Jr. et al. |
| 5,923,882 A | 7/1999 | Abrams et al. |
| 5,935,207 A | 8/1999 | Logue et al. |
| 5,937,409 A | 8/1999 | Wetherbee |
| 5,940,075 A | 8/1999 | Mutschler, III et al. |
| 5,940,847 A | 8/1999 | Fein et al. |
| 5,953,524 A | 9/1999 | Meng et al. |
| 5,956,489 A | 9/1999 | San Andres et al. |
| 5,961,601 A | 10/1999 | Iyengar |
| 5,963,952 A | 10/1999 | Smith |
| 5,974,430 A | 10/1999 | Mutschler, III et al. |
| 5,983,227 A | 11/1999 | Nazem et al. |
| 5,987,242 A | 11/1999 | Bentley et al. |
| 5,987,247 A | 11/1999 | Lau |
| 5,991,802 A | 11/1999 | Allard et al. |
| 5,995,753 A | 11/1999 | Walker |
| 6,006,230 A | 12/1999 | Ludwug et al. |
| 6,014,637 A | 1/2000 | Fell et al. |
| 6,014,666 A | 1/2000 | Helland et al. |
| 6,023,714 A | 2/2000 | Hill et al. |
| 6,032,207 A | 2/2000 | Wilson |
| 6,038,551 A | 3/2000 | Barlow et al. |
| 6,058,455 A | 5/2000 | Islam et al. |
| 6,059,913 A | 5/2000 | Martin et al. |
| 6,061,690 A | 5/2000 | Nori et al. |
| 6,067,413 A | 5/2000 | Gustafsson et al. |
| 6,067,578 A | 5/2000 | Zimmerman et al. |
| 6,072,664 A | 6/2000 | Aoyagi et al. |
| 6,076,108 A | 6/2000 | Courts et al. |
| 6,101,502 A | 8/2000 | Heubner et al. |
| 6,101,607 A | 8/2000 | Bachand et al. |
| 6,108,717 A | 8/2000 | Kimura et al. |
| 6,115,744 A | 9/2000 | Robins |
| 6,119,078 A | 9/2000 | Kobayakawa et al. |
| 6,119,115 A | 9/2000 | Barr |
| 6,119,155 A | 9/2000 | Rossmann et al. |
| 6,121,968 A | 9/2000 | Arcuri et al. |
| 6,122,637 A | 9/2000 | Yohe et al. |
| 6,128,623 A | 10/2000 | Mattis et al. |
| 6,138,150 A | 10/2000 | Nichols et al. |
| 6,138,171 A | 10/2000 | Walker |
| 6,151,624 A | 11/2000 | Teare et al. |
| 6,167,438 A | 12/2000 | Yates et al. |
| 6,167,441 A | 12/2000 | Himmel |
| 6,167,524 A | 12/2000 | Goodnow et al. |
| 6,173,316 B1 | 1/2001 | De Boor et al. |
| 6,178,461 B1 | 1/2001 | Chan et al. |
| 6,185,608 B1 | 2/2001 | Hon et al. |
| 6,185,625 B1 | 2/2001 | Tso et al. |
| 6,202,199 B1 | 3/2001 | Wydogny et al. |
| 6,203,220 B1 | 3/2001 | Takenoshita et al. |
| 6,205,480 B1 | 3/2001 | Broadhurst et al. |
| 6,212,192 B1 | 4/2001 | Mirashrafi et al. |
| 6,218,958 B1 | 4/2001 | Eichstaedt et al. |
| 6,230,160 B1 | 5/2001 | Chan et al. |
| 6,230,313 B1 | 5/2001 | Callahan et al. |
| 6,246,403 B1 | 6/2001 | Tomm |
| 6,246,422 B1 | 6/2001 | Emberling et al. |
| 6,247,044 B1 | 6/2001 | Gosling et al. |
| 6,249,844 B1 | 6/2001 | Schloss et al. |
| 6,253,228 B1 | 6/2001 | Ferris et al. |
| 6,253,234 B1 | 6/2001 | Hunt et al. |
| 6,279,151 B1 | 8/2001 | Breslau et al. |
| 6,282,670 B1 | 8/2001 | Rezaul Islam et al. |
| 6,286,133 B1 | 9/2001 | Hopkins |
| 6,297,819 B1 | 10/2001 | Furst |
| 6,300,947 B1 | 10/2001 | Kanevsky |
| 6,311,215 B1 | 10/2001 | Bakshi et al. |
| 6,326,957 B1 | 12/2001 | Nathan et al. |
| 6,334,126 B1 | 12/2001 | Nagatomo et al. |
| 6,334,157 B1 | 12/2001 | Oppermann et al. |
| 6,336,161 B1 | 1/2002 | Watts |
| 6,343,148 B2 | 1/2002 | Nagy |
| 6,345,279 B1 | 2/2002 | Li et al. |
| 6,351,767 B1 | 2/2002 | Batchelder et al. |
| 6,353,447 B1 | 3/2002 | Truluck et al. |
| 6,353,452 B1 | 3/2002 | Hamada et al. |
| 6,354,477 B1 | 3/2002 | Trummer |
| 6,363,352 B1 | 3/2002 | Dailey et al. |
| 6,370,561 B1 | 4/2002 | Allard et al. |
| 6,370,682 B1 | 4/2002 | Eckardt et al. |
| 6,373,841 B1 | 4/2002 | Goh et al. |
| 6,381,735 B1 | 4/2002 | Hunt |
| 6,397,253 B1 | 5/2002 | Quinlan et al. |
| 6,401,099 B1 | 6/2002 | Koppulu et al. |
| 6,401,132 B1 | 6/2002 | Bellwood et al. |
| 6,405,241 B2 | 6/2002 | Gosling et al. |
| 6,412,008 B1 | 6/2002 | Fields et al. |
| 6,421,717 B1 | 7/2002 | Kloba et al. |
| 6,421,733 B1 | 7/2002 | Tso et al. |
| 6,424,981 B1 | 7/2002 | Isaac et al. |

| | | | | | | |
|---|---|---|---|---|---|---|
| 6,426,761 B1 | 7/2002 | Kanevsky et al. | | 6,920,480 B2 | 7/2005 | Mitchell et al. |
| 6,430,575 B1 | 8/2002 | Dourish et al. | | 6,922,827 B2 | 7/2005 | Vasilik et al. |
| 6,438,576 B1 | 8/2002 | Huang et al. | | 6,928,488 B1 | 8/2005 | de Jong et al. |
| 6,457,030 B1 | 9/2002 | Adams et al. | | 6,944,797 B1 | 9/2005 | Guthrie et al. |
| 6,457,172 B1 | 9/2002 | Carmichael et al. | | 6,948,174 B2 | 9/2005 | Chiang et al. |
| 6,460,071 B1 | 10/2002 | Hoffman | | 6,950,875 B1 | 9/2005 | Slaughter et al. |
| 6,460,141 B1 | 10/2002 | Olden | | 6,954,751 B2 | 10/2005 | Christfort et al. |
| 6,463,442 B1 | 10/2002 | Bent et al. | | 6,954,854 B1 | 10/2005 | Miura et al. |
| 6,466,203 B2 | 10/2002 | Van Ee | | 6,961,750 B1 | 11/2005 | Burd et al. |
| 6,470,381 B2 | 10/2002 | De Boor et al. | | 6,961,754 B2 | 11/2005 | Christopoulos et al. |
| 6,473,609 B1 | 10/2002 | Schwartz et al. | | 6,961,776 B1 | 11/2005 | Buckingham et al. |
| 6,480,894 B1 | 11/2002 | Courts et al. | | 6,964,009 B2 | 11/2005 | Samaniego et al. |
| 6,487,665 B1 | 11/2002 | Andrews et al. | | 6,990,653 B1 | 1/2006 | Burd et al. |
| 6,496,692 B1 | 12/2002 | Shanahan | | 7,013,340 B1 * | 3/2006 | Burd et al. ............... 709/229 |
| 6,505,238 B1 | 1/2003 | Tran | | 7,016,963 B1 | 3/2006 | Judd et al. |
| 6,509,913 B2 | 1/2003 | Martin et al. | | 7,076,786 B2 | 7/2006 | Burd et al. |
| 6,514,408 B1 | 2/2003 | Smith et al. | | 7,099,870 B2 | 8/2006 | Hsu et al. |
| 6,523,027 B1 | 2/2003 | Underwood | | 7,117,504 B2 | 10/2006 | Smith et al. |
| 6,535,896 B2 | 3/2003 | Britton et al. | | 7,159,007 B2 | 1/2007 | Stawikowski |
| 6,539,421 B1 | 3/2003 | Appelman et al. | | 7,162,723 B2 | 1/2007 | Guthrie et al. |
| 6,539,501 B1 | 3/2003 | Edwards | | 7,171,443 B2 | 1/2007 | Tiemann et al. |
| 6,542,908 B1 | 4/2003 | Ims | | 7,171,454 B2 | 1/2007 | Nguyen |
| 6,542,967 B1 | 4/2003 | Major | | 7,181,731 B2 | 2/2007 | Pace et al. |
| 6,546,473 B2 | 4/2003 | Cherkasova et al. | | 7,188,112 B1 | 3/2007 | Lindquist et al. |
| 6,546,516 B1 | 4/2003 | Wright et al. | | 7,188,155 B2 | 3/2007 | Flurry et al. |
| 6,556,217 B1 | 4/2003 | Mäkipää et al. | | 7,216,294 B2 | 5/2007 | Gibbs et al. |
| 6,557,038 B1 | 4/2003 | Becker et al. | | 2001/0013070 A1 | 8/2001 | Sasaki |
| 6,560,598 B2 | 5/2003 | Delo et al. | | 2001/0027474 A1 | 10/2001 | Nachman et al. |
| 6,560,618 B1 | 5/2003 | Ims | | 2001/0037404 A1 | 11/2001 | Hafsteinsson et al. |
| 6,560,639 B1 | 5/2003 | Dan et al. | | 2001/0047385 A1 | 11/2001 | Tuatini |
| 6,560,699 B1 | 5/2003 | Konkle | | 2001/0054020 A1 | 12/2001 | Barth et al. |
| 6,563,517 B1 | 5/2003 | Bhagwat et al. | | 2002/0004815 A1 | 1/2002 | Muhlestein et al. |
| 6,563,913 B1 | 5/2003 | Kaghazian | | 2002/0008703 A1 | 1/2002 | Merrill et al. |
| 6,564,251 B2 | 5/2003 | Katariya et al. | | 2002/0056085 A1 | 5/2002 | Fahraeus |
| 6,591,272 B1 | 7/2003 | Williams | | 2002/0062396 A1 | 5/2002 | Kakei et al. |
| 6,593,944 B1 | 7/2003 | Nicolas et al. | | 2002/0073163 A1 | 6/2002 | Churchill et al. |
| 6,601,233 B1 | 7/2003 | Underwood | | 2002/0078101 A1 | 6/2002 | Chang et al. |
| 6,606,418 B2 | 8/2003 | Mitchell et al. | | 2002/0078144 A1 | 6/2002 | Lamkin et al. |
| 6,609,128 B1 | 8/2003 | Underwood | | 2002/0083171 A1 | 6/2002 | Hoogenboom et al |
| 6,610,105 B1 | 8/2003 | Martin et al. | | 2002/0095445 A1 | 7/2002 | alSafadi et al. |
| 6,622,168 B1 | 9/2003 | Datta | | 2002/0107891 A1 | 8/2002 | Leamon et al. |
| 6,633,416 B1 | 10/2003 | Benson | | 2002/0108102 A1 | 8/2002 | Muhlestein et al. |
| 6,643,712 B1 | 11/2003 | Shaw et al. | | 2002/0116534 A1 | 8/2002 | Teeple |
| 6,678,518 B2 | 1/2004 | Eerola | | 2002/0120677 A1 | 8/2002 | Goward et al. |
| 6,687,735 B1 | 2/2004 | Logston et al. | | 2002/0120753 A1 | 8/2002 | Levanon et al. |
| 6,697,825 B1 | 2/2004 | Underwood et al. | | 2002/0129016 A1 | 9/2002 | Christfort et al. |
| 6,704,024 B2 | 3/2004 | Robotham et al. | | 2002/0133635 A1 | 9/2002 | Schechter et al. |
| 6,704,728 B1 | 3/2004 | Chang et al. | | 2002/0138331 A1 | 9/2002 | Hosea et al. |
| 6,714,794 B1 | 3/2004 | O'Carroll | | 2002/0152244 A1 | 10/2002 | Dean et al. |
| 6,725,219 B2 | 4/2004 | Nelson et al. | | 2002/0161923 A1 | 10/2002 | Ndili |
| 6,728,421 B2 | 4/2004 | Kokemohr | | 2002/0161938 A1 | 10/2002 | Bonomo et al. |
| 6,732,364 B1 | 5/2004 | Bhaskaran et al. | | 2002/0188890 A1 | 12/2002 | Shupps et al. |
| 6,738,968 B1 | 5/2004 | Bosworth | | 2002/0194227 A1 | 12/2002 | Day et al. |
| 6,757,708 B1 | 6/2004 | Craig et al. | | 2003/0004998 A1 | 1/2003 | Datta |
| 6,757,899 B2 | 6/2004 | Zhdankin et al. | | 2003/0009476 A1 | 1/2003 | Fomenko et al. |
| 6,757,900 B1 | 6/2004 | Burd et al. | | 2003/0009519 A1 | 1/2003 | Gosling et al. |
| 6,772,408 B1 | 8/2004 | Velonis et al. | | 2003/0009567 A1 | 1/2003 | Farouk |
| 6,782,403 B1 | 8/2004 | Kino et al. | | 2003/0018827 A1 | 1/2003 | Gutherie et al. |
| 6,789,105 B2 | 9/2004 | Ludwig et al. | | 2003/0025728 A1 | 2/2003 | Ebbo et al. |
| 6,792,575 B1 | 9/2004 | Samaniego et al. | | 2003/0028565 A1 | 2/2003 | Landsman et al. |
| 6,792,605 B1 | 9/2004 | Roberts et al. | | 2003/0028892 A1 | 2/2003 | Gewickey et al. |
| 6,792,607 B1 | 9/2004 | Burd et al. | | 2003/0066056 A1 | 4/2003 | Petersen et al. |
| 6,826,597 B1 | 11/2004 | Lonnroth et al. | | 2003/0074634 A1 * | 4/2003 | Emmelmann ............... 715/513 |
| 6,832,263 B2 | 12/2004 | Polizzi et al. | | 2003/0097639 A1 | 5/2003 | Niyogi et al. |
| 6,836,883 B1 | 12/2004 | Abrams | | 2003/0110234 A1 | 6/2003 | Egli et al. |
| 6,847,333 B2 | 1/2005 | Bokhour | | 2003/0187952 A1 | 10/2003 | Young et al. |
| 6,886,013 B1 | 4/2005 | Beranek | | 2003/0204622 A1 | 10/2003 | Blizniak et al. |
| 6,892,226 B1 | 5/2005 | Tso et al. | | 2003/0233477 A1 | 12/2003 | Ballinger et al. |
| 6,901,437 B1 | 5/2005 | Li | | 2004/0003112 A1 | 1/2004 | Alles et al. |
| 6,904,600 B1 | 6/2005 | James et al. | | 2004/0003117 A1 | 1/2004 | McCoy et al. |
| 6,915,307 B1 | 7/2005 | Mattis et al. | | 2004/0003139 A1 | 1/2004 | Cottrille et al. |
| 6,915,454 B1 | 7/2005 | Moore et al. | | 2004/0003248 A1 | 1/2004 | Arkhipov |
| 6,918,107 B2 | 7/2005 | Lucas et al. | | 2004/0012627 A1 | 1/2004 | Zakharia et al. |

| | | | |
|---|---|---|---|
| 2004/0015879 A1 | 1/2004 | Pauw et al. |
| 2004/0030740 A1 | 2/2004 | Stelting |
| 2004/0073873 A1 | 4/2004 | Croney et al. |
| 2004/0172484 A1 | 9/2004 | Hafsteinsson et al. |
| 2004/0218045 A1 | 11/2004 | Bodnar et al. |
| 2004/0230958 A1 | 11/2004 | Alaluf |
| 2005/0091230 A1 | 4/2005 | Ebbo et al. |
| 2005/0138560 A1 | 6/2005 | Lee et al. |
| 2005/0171967 A1 | 8/2005 | Yuknewicz |
| 2005/0193097 A1 | 9/2005 | Guthrie et al. |
| 2005/0229186 A1 | 10/2005 | Mitchell et al. |
| 2005/0251380 A1 | 11/2005 | Calvert et al. |
| 2005/0256834 A1 | 11/2005 | Millington et al. |
| 2005/0256924 A1 | 11/2005 | Chory et al. |
| 2005/0256933 A1 | 11/2005 | Millington et al. |
| 2005/0257138 A1 | 11/2005 | Chory et al. |
| 2005/0268292 A1 | 12/2005 | Ebbo et al. |
| 2005/0278351 A1 | 12/2005 | Niyogi et al. |
| 2006/0004901 A1 | 1/2006 | Burd et al. |
| 2006/0004910 A1 | 1/2006 | Burd et al. |
| 2006/0020883 A1 | 1/2006 | Kothari et al. |
| 2006/0112336 A1 | 5/2006 | Gewickey et al. |
| 2006/0130038 A1 | 6/2006 | Claussen et al. |
| 2007/0005795 A1 | 1/2007 | Gonzalez |
| 2007/0033533 A1 | 2/2007 | Sull |
| 2007/0174845 A1 | 7/2007 | Guthrie et al. |

FOREIGN PATENT DOCUMENTS

| | | |
|---|---|---|
| EP | 1 111 680 A2 | 6/2001 |
| EP | 1 156 415 A2 | 11/2001 |
| EP | 1 156 427 A2 | 11/2001 |
| EP | 1 156 428 A2 | 11/2001 |
| EP | 1 156 429 A2 | 11/2001 |
| EP | 1 164 473 A2 | 12/2001 |
| EP | 1156427 | 4/2002 |
| EP | 1 241 593 A2 | 9/2002 |
| GB | 1 367 741 | 9/1974 |
| GB | 2 339 374 A | 1/2000 |
| JP | 11-098134 | 4/1999 |
| JP | 2002-24079 | 1/2002 |
| JP | 2002-41299 | 2/2002 |
| JP | 2002-49484 | 2/2002 |
| JP | 2002-49585 | 2/2002 |
| WO | WO 98/21651 | 5/1998 |
| WO | WO 98/44695 | 10/1998 |
| WO | WO 99/34288 | 7/1999 |
| WO | WO 01/27783 | 4/2001 |
| WO | WO 01/75667 | 10/2001 |
| WO | WO 02/21343 | 3/2002 |

OTHER PUBLICATIONS

"Metadata Activity Statement", Feb. 2001, W3C.
"Metadata Activity Statement", http://web.archive.org/web/20000616163950/http://www.w3.org/Metadata/Activity.html, May 8, 2000, pp 1-5.
"Web Services Description Language (WSDL)", Mar. 2001, W3C.
"A Brief History of Hypertext", from Microsoft Corporation © 1996.
"Alterego Networks Introduces First Mobile Web Server to Enterprises, Telcos and Providers"; Redwood City, CA; Nov. 14, 2000; 3 pages.
"Best Practices for Creating Adaptive User Interfaces with the Mobile Internet Toolkit"; Microsoft Corporation, Jan. 2002; 15 pages.
"Best Practices for the Microsoft Mobile Internet Toolkit Image Control"; Microsoft Corporation, Feb. 2002.
"Bluestone Software Lays Foundation for Internet Operating Environment with Total-E-Server . . . " Screaming Media, Business Wire; Jun. 5, 2000; 3 pages.
"Developing ASP-Based Applications" from Microsoft Corporation © 1996.
"HTML Encyclopaedia—'The form tag—The HTML element'" http://www.scit.wlv.ac.uk/encyc/form.html; 2 pages.
"NCSA httpd" nttpd@ncsa.uiuc.edu.
"Spyglass Prism 3.1 Supports the latest Standards for Transmission of Content to Wireless Devices," Internet citation, Jul. 5, 1000.
Abrams et al., "UIML an applicance-independent XML user inteface language," Computer Networls, Elsevier Science Publishes B.V., Amsterdam, NL, vol. 31, No. 11-16, May 17, 1999 pp. 1695-1708.
Aggarwal, Charu et al., "Caching on the World Wide Web" IEEE Transactions on Knowledge and Data Engineering, vol. 11, No. 1, Jan./Feb. 1999. pp. 94-107.
Alves Dos Santooa, L.M., "Multimedia Data and tools for Web services over Wireless Platforms," IEEE Personal Communications, Oct. 1998, pp. 42-46.
Anderson, Richard; Homer, Alex; Howard, Rob; Sussman, Dave; "A Preview of Activer Server Pages+"; Copyright 2000, Wrox Press, pp. 1-73.
"ColdFusion Web Application Serve"r, update and summary, from Allaire Corp - www@allaire.com.
Ballinger, "Fun with SOAP Extensions", Mar. 2001, MSDN, pp. 1-5.
Chapter 1 Introduction - "Java Script Language", Netscape Communications, Apr. 23, 2001.
Chapter 3, "Mechanics of Developing JavaScript Applications," Server-Side Javascript Guide, 'Online! 1999, pp. 51-108, www.Developer.netscape.com/docs/manuals, ssjs/1_4/ssjs.pdf>.
Chapter 6, "Session Management Service," Server-Side Javascript Guide, 'Online! 1999, pp. 125-166, www.developer.netscape.com/docs/manuals/ssjs/1_4/ssjs.pdf>.
Ciancarini et al., "An extensible rendering engine for XML and HTNL", Computer Networks and ISDN System, North Holland Publishing, vol. 30, No. 1-7, Apr. 1998, pp. 225-237.
Custer, Helen; "Inside Windows NT", Microsoft Press 1993; pp. 74-81.
Davidson, et al., "Schema for Object-Oriented IML 2.0", Jul. 1999, W3 Consortium, pp. 1-29.
Davulcu, Hasan; Freire, Juliana; Kifer, Michael; Ramakrishnan, I.V.; "A Layered Architecture for Querying Dynamic Web Content"; ACM 1999; pp. 491-502.
Dobson, R., "Data Binding in Dynamic HTML," DBMS MAG, 'Online! Mar. 1998 (Mar. 1993) pp. 47-52.
Dowd, Tyson et al., "Compiling Mercury to the .NET Common Language Runtime," Electronic Notes in Theoretical Computer Sciences 59 No. 1 (Netherlands) (2001), pp. 1-16.
Duan, Nick N.; "Distributed Database Access in a Corporate Environment Using Java" Bell Atlantic Corporation; 1996; 8 pages.
Esposito, Dino, "Heaven sent," Developer Network Journal, Mar.-Apr. 2001, Matt Publishing, UK, No. 23, pp. 18-24.
European Search Report EP 02 00 5786.
Flammia, G., "The Wireless Internet Today and Tomorrow," IEEE Intelligent Systems, [Online] vol. 15, Sep. 2000 (Sep. 2000), pp. 82-83.
Franklin, K., "Supercharge Data Binding," Visual Basic Programmer's Journal, Mar. 2000, Fawcette Technical Publications, vol. 10, No. 3, pp. 32-33, 39-40, 42, 44, 46.
Frost, Jim: "Windows NT Security"; May 4, 1995; 7 pages; http://world.std.com/~jimf/papers/nt-security/nt-security.html.
Hammond, Eric, "Hammock swings through Web Interfaces" (3 pages).
Hammock(™), Think of it as Swing(™) for the Web (10 pages).
Hannay, Phillip et al., "MSIL for the .NET Framework: The Next Battleground?", Virus Bulletin Conference, Sep. 2001, pp. 173-196.
Heins, et al., "Taking Your Information Into the Wireless World: Developing Information for Delivery to Mobile Devices", IEEE, pp. 237-244, Oct. 2001.
Holmes, John W.; e-Mail response to question regarding GET/POST. HTTP request, extracted from Google's News Groups, php.general, Nov. 11, 2002.
Hovanes, Michael E.; Deal, John R. Grizz; Rowberg, Alan H.; "Seamless Multiresolution Display of Portable Wavelet-Compressed Images" Journal of Digital Imaging, vol. 12, No. 2 suppl 1 (May), 1999, pp. 109-111.
Howard, "Web Services with ASP.NET", Feb. 2001, MSDN, pp. 1-9.

Ingham, David B.; "W3Objects: A Distributed Object-Oriented Web Server" Object-Oriented Web Servers and data Modeling Workshop, Sixth International World Wide Web Conference, Apr. 7, 1997, Santa Clara, CA 4 pages.

Kaasinen Eija et al.: "Two approaches to bringing internet services to WAP devices," Computer Networks and ISDN Systems, North Holland Publishing, Amsterdam, NL, vol. 33, No. 1, 2000, pp. 231-246.

Kaffe, "Server Side Java", Jan. 16, 2998.

Kagal, et al., "Centaurus: A Framework for Intelligent Services in a Mobile Environment" Computer Science and Electrical Engineering, IEEE, pp. 195-201, Apr. 2001.

Kirda, "Web Engineering Device Independent Web Services", Distributed Systems Group, IEEE, pp. 795-796, May 2001.

Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.

Krikelis, A., "Mobile multimedia: shapring the Inforverse", IEEE Concurrency, Jan.-Mar. 1999, pp. 7-9.

Kunz, T.; El Shentenawy, M.; Gaddah, A..; Hafez, R.; Image Transcoding for Wireless WWW Access: The User Perspective; Multimedia Computing and Networking 2002, Proceedings of SPIE vol. 467 (2002) pp. 28-33.

Langheinrich, M., et al., "Unintrusive customization techniques for Web advertising," Computer Networks, vol. 31, No. 11-16. May 17, 1999, pp. 1259-1272.

Lee, C.-H., et al., "Web personalization expert with combining collaborative filtering and association rule mining technique," Expert Systems With Applications, vol. 21, No. 3, Oct. 2001, pp. 131-137.

Li, W.-S., et al., "PowerBookmarks: a system for personalizable Web information organization, sharing, and management, " Computer Networks, vol. 31, No. 11-16, May 17, 1999, pp. 1375-1389.

Marshall, "HTTP Made Really Easy - A Practical Guide to Writing Clients and Servers", Aug. 15, 1997.

Mobasher, B., "A Web personalization Engine Based on User Transaction Clustering," Proc. Of the 9th Annual Workshop on Information Tech. And Systems, Dec. 11, 1999, pp. 179-184.

Moore, M M, et al. "Migrating legacy user interfaces to the internet: shifting dialogue initiative", IEEE, Nov. 23, 2000, pp. 52-58.

Muller-Wilken S. et al.; "On integrating mobile devices into a workflow management scenario," Database and Expert Systems Applications, 2000. Proceedings 11th International Workshop on Sep. 4-8, 2000, Piscataway, NJ, USA, IEEE, pp. 186-190.

Nadamoto, Akiyo; Kondo, Hiroyuki; Tanaka, Katsumi; "WebCarousel: Restructuring Web Search Results for Passive Viewing in Mobile Environments" IEEE 2001 pp. 164-165.

O'Leary, M., "Web personalization Does It Your Way," O'Leary Online, vol. 23, No. 2, Mar.-Apr. 1999, pp. 79-80.

Partial European Search Report for EP 02 00 5786.

Penn, Gerald; Hu Jianying; Luo, Hengbin; McDonald, Ryan; "Flexible Web Document Analysis for Deliver to Narrow-Bandwidth Devices"; IEEE 2001; pp. 1074-1078.

Platt, "Thunderclap, the Newsletter of Rolling Thunder Computing", dated to Aug. 2001, vol. 3, No. 2, pp. 1-18.

OOP Launches Hammock at JavaOne (1 page).

Pyarali, Irfan; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.

Ramakrishnan, N., "PIPE: Web Personalization by Partial Evaluation," IEEE Internet Computing, vol. 4, No. 6, Nov.-Dec. 2000, pp. 21-31.

Ren, Robin, "Practical Active Server Pages Technique: Porting Windows CGI Applications to ASP", Microsoft Interactive Developer, No. 10, pp. 89-98, ASCII Corporation, Nov. 18, 1998 (CSDB: Technical Journal in Japan 2000001200009).

Seddon, Bill, "Generating XP Style webparts from a web control," The Code Project - Generating XP style webparts from a web control - ASP.NET, online at http://www.codeproject.com/aspnet/webpartscontrol.asp, retrieved Apr. 8, 2004, 10 pages.

Sells, Chris et al., "Generating Code at Run Time with Reflection. Emit," Windows Developer Magazine, Aug. 2002, vol. 13, No. 8, pp. 26-34.

Shapiro, M., "A Binding Protocol for Distributed Shared Objects," Proceedings of the International Conference on Distributed Computing Systems, Poznan, Poland, Jun. 21-24, 1994, Los Alamitos, IEEE COMP. SOC. PRESS.

Shi, Weisong; Collins, Eli; Karamcheti, Vijay; "Modeling Object Characteristics of Dynamic Web Content"; Proceedings of the IEEE Global Internet Conference, Nov. 2002, 5 pgs.

Stewart, Tony: "The Document as Application: Issues and Implications" GCA XML Europe; pp. 575-599.

Syme, Don, "ILX: Extending the .NET Common IL for Functional Language Interoperability," Electronic Notes in Theoretical Computer Science 59 No. 1 (2001), pp. 1-20.

Tuecke, "Microsoft Professional Developers Conference Summary", 1996.

Varela, Carlos A.; Caroline C. Hayes; "Providing Data on the Web: From Examples to Programs," Second International WWW Conference, Chicago, IL; Oct. 17, 1994; 17 pages.

W3C, SOAP Version 1.2 Specification Jul. 9, 2001 Working Draft, Jul. 2001.

Winer, Dave, "XMP RPC Specification", Jun. 15, 1999.

Wu Dapeng; Hou, Yiwci Thomas-Zhang, Ya-Qin; "Scalable Video Transport over Wireless IP Networks"; IEEE 2000; pp. 1185-1191.

Yoshikawa, Kazuhiro, et al. "Expanding a System via the Internet: Construction/Operation Points to be Considered: Exploring a Construction/Operation for Improving Reliability and Security", Nikkei Open Systems, No. 63, pp. 182-191, Nikkei Business Publications, Inc. Jun. 15, 1998 (CSBD: Technical Jounal in Japan 199800933009).

A.D. Gordon and D Syme, *Typing a Multi-Language Intermediate Code*, submitted to The 28th ACM Principles of Programming Languages, (Feb. 2001), pp. 1-9.

European Search Report for EP 01115100.

Fabre, Christian et al., *Java-ANDF Feasibility Study Final Report*, Mar. 26, 1997.

Gosling, J. et al., *The Java Language Environment*, A White Paper, Sun Microsystems Computer Company, Oct. 1, 1995 pp. 1, 4-85.

Henglein, Fritz & Jorgensen, Jesper, *Formally Optimal Boxing*, Proceedings of the 21st ACM SIGPLAN-SIGACT Symposium on Principles of Programming Languages, 1994, pp. 213-216.

Johnson, Andrew et al., *The ANDF Technology Program at the OSF RI*; Dec. 8, 1992.

Lindholm, Tim & Yellin, Frank, *The Java Virtual Machine Specification, Second Edition*, Sun Microsystems, 1999, Ch. 2, pp. 1-44.

M. Tofte and J.P. Talpin, *Region-Based Memory Management, Information and Computation*, 1997, vol. 132(2), pp. 109-176.

Manual page of GCC, Free Software Foundation, 1998. Retreived from Internet on Feb. 20, 2008. Retreived from URL: <http://www.freebsd.org/cgi/man.cgi?query=gcc&apropos=0&sektion=0&manpath=FreeBSD+4.8-RELEASE&format=html>.

Peeling, Dr. N.E., *ANDF Features and Benefits*, Feb. 5, 1993.

Rational, Rose/C++, Rational Software Corporation, whole manual, released 1996.

S. Peyton Jones and J. Launchbury, *Unboxed Values as First Class Citizens, In Functional Programming Languages and Computer Architecture*, vol. 523 of Lecture Notes in Computer Science, Springer Verlag, 1991, pp. 636-666.

Shao, Zhong, *Flexible Representation Analysis*, Proceedings of the Second ACM SIGPLAN International Conference of Functional Programming, 1997, pp. 85-98.

SNAP Using the SNAP Language, Template Software, Chapter 7, published 1997.

Software Construction with Examples in ADA, Bo Sanden, published 1994, pp. 104-109.

Standard Output of Comman, 'ar': contents of '/usr/lib/libbz2.a', print out of files in '/usr/lib/libbz2.a'.

Thiemann, Peter, *Unboxed Values and Polymorphic Typing Revisiting*, Proceedings of the Seventh International Conference On Functional Programming Languages and Computer Architecture, 1995, pp. 24-35.

Visual Object-Oriented Programming, M. Burnett et al., pp. 1-42, 199-274, published 1994.

X. Leroy, *Unboxed Ojects and Polymorphic*, in 19th *ACM SIGPLAN-SIGACT Symposium on Principles of Programming Languages*, ACM Press, 1992, pp. 177-188.

Y.G. Park and B. Goldberg, *Escape Analysis On Lists*, in *ACM SIGPLAN on Programming Language Design and Implementation*, ACM Press, 1992, pp. 116-127.

Manual page of AR, Free Software Foundation, 1999. Retrieved from Internet on Feb. 20, 2008. Retreived from URL: <http://www.freebsd.org/cgi/man.cgi?query=ar&apropos=0&sektion=0&manpath=FreeBSD+4.8-RELEASE&format=html>.

Office Action dated Nov. 17, 2006 in U.S. Appl. No. 09/875,324.
Office Action dated Jul. 12, 2006 in U.S. Appl. No. 09/875,324.
Office Action dated Jan. 10, 2006 in U.S. Appl. No. 09/875,324.
Office Action dated Jun. 30, 2005 in U.S. Appl. No. 09/875,324.
Office Action dated Jan. 5, 2005 in U.S. Appl. No. 09/875,324.
Office Action dated Jan. 2, 2008 in U.S. Appl. No. 11/120,511.
Office Action dated Dec. 1, 2005 in U.S. Appl. No. 10/174,348.
Office Action dated Jun. 19, 2006 in U.S. Appl. No. 10/174,348.
Office Action dated Dec. 21, 2006 in U.S. Appl. No. 10/174,348.
Office Action dated Nov. 28, 2007 in U.S. Appl. No. 10/840,965.

* cited by examiner

```
1   <%@ Page Language="VB" Description="Simple Sample Page" Errorpage="ErrorPage.aspx" %>
2   <html>
3     <script runat=server>
4       Sub AddButton_Click(ByVal Source as Object, By Val E as Event Args)
5         Message.Text = "Add" & UserName.Text
6       End Sub
7       Sub DeleteButton_Click(ByVal Source as Object, By Val E as Event Args)
8         Message.Text = "Delete" & UserName.Text
9       End Sub
10    </script>
11    <body>
12      <form runat="server">
13        User Name:    <input type="Text" id="UserName" runat=server>
14        <br>
15        <button id="AddButton" value="ADD" OnServerClick="AddButton_Click" runat=server>
16        <button id="DeleteButton" value="DELETE" OnServerClick="DeleteButton_Click" runat=serve
17        <br><br>
18        <span id="Message" runat=server> </span>
19      </form>
20    </body>
21  </html>
```

POSTBACK INPUT HANDLING BY SERVER-SIDE CONTROL OBJECTS

RELATED APPLICATIONS

This application is a continuation application of U.S. patent application Ser. No. 09/574,165, filed May 18, 2000 and entitled POSTBACK INPUT HANDLING BY SERVER-SIDE CONTROL OBJECTS, now U.S. Pat. No. 7,013,340, which is hereby incorporated herein by reference.

CROSS-REFERENCE TO RELATED APPLICATIONS

The present application is related to U.S. patent application Ser. No. 09/574,144 entitled STATE MANAGEMENT OF SERVER-SIDE CONTROL OBJECTS, now U.S, Pat. No.; U.S. Pat. No. 6,757,900 application Ser. No. 09/573,769, entitled SERVER-SIDE CONTROL OBJECTS FOR PROCESSING CLIENT-SIDE USER INTERFACE ELEMENTS, now U.S. Pat. No. 6,961,750; U.S. patent application Ser. No. 09/573,768, entitled SERVER-SIDE CODE GENERATION FROM A DYNAMIC WEB PAGE CONTENT FILE, now U.S. Pat. No. 6,990,653; and U.S. patent application Ser. No. 09/573,656, entitled DATABINDING USING SERVER-SIDE CONTROL OBJECTS, now U.S. Pat. No. 6,792,607, flied concurrently herewith and assigned to the Assignee of the present invention.

TECHNICAL FIELD

The invention relates generally to a web server framework, and more particularly to server-side control objects that handle postback input received from a client.

BACKGROUND OF THE INVENTION

A typical web browser receives data from a web server that defines the appearance and rudimentary behavior of a web page for display on a client system. In a typical scenario, a user specifies a Uniform Resource Locator ("URL"), a global address of a resource on the World Wide Web, to access a desired web site. Generally, the term "resource" refers to data or routines that can be accessed by a program. An example URL is "http://www.microsoft.com/ms.htm". The first part of the example URL indicates a given protocol (i.e., "http") to be used in the communication. The second part specifies the domain name (i.e., "www.microsoft.com") where the resource is located. The third part specifies the resource (i.e., a file called "ms.htm") within the domain. Accordingly, a browser generates an HTTP (HyperText Transport Protocol) request associated with the example URL to retrieve the data associated with ms.htm file within the www.microsoft.com domain. A web server hosting the www.microsoft.com site receives the HTTP request and returns the requested web page or resource in an HTTP response to the client system for display in the browser.

The "ms.htm" file of the example above includes static HTML (HyperText Markup Language) code. HTML is a plain-text authoring language used to create documents (e.g., web pages) on the World Wide Web. As such, an HTML file can be retrieved from a web server and displayed as a web page in a browser to present the rich graphical experience that users have come to expect while viewing information from the Internet. Using HTML, a developer can, for example, specify formatted text, lists, forms, tables, hypertext links, inline images and sounds, and background graphics for display in the browser. An HTML file, however, is a static file that does not inherently support dynamic generation of web page content.

If dynamic content is to be displayed, such as a changing stock price or traffic information, a server-side application program is generally developed to handle the more complex client-server interaction. The server-side application program processes the HTTP request and generates the appropriate HTML code for transmission to the client in an HTTP response. An exemplary HTTP request may include parameters, such as data in query string or data from web-based forms. As such, a server-side application program can process these parameters and dynamically generate HTML code for transmission in an HTTP response to the client. An exemplary server-side application program may generate a document containing appropriate HTML code using a sequence of one or more formatted text write operations to a memory structure. Thereafter, the resulting document is transmitted to a client system in an HTTP response, where it is displayed as a web page in the browser.

Developing a server-side application program can be a complex task requiring not only familiarity with normal HTML coding that is used to layout a web page, but also with programming basics, including one or more programming languages (e.g., C++, Perl, Visual Basic, or Jscript). Web page designers, on the other hand, are frequently graphics designers and editors, who may lack programming experience. Furthermore, simplifying complex web page development can speed the development of new web content by any developer. Generally, development of a custom server-side application also requires tremendous effort, so much, in fact, that developers are often disinclined to attempt it. It is desirable, therefore, to provide a development framework that allows a developer to dynamically create and process a web page with minimal programming.

One approach to minimize the programming requirements of dynamic web page generation has been the Active Server Page (ASP) framework, provided by Microsoft Corporation. An ASP file typically includes Visual Basic or Jscript code, for example, to process an HTTP request that specifies the ASP file as the desired resource and, thereafter, to generate the resulting HTML code in a HTTP response to the client. Furthermore, an ASP file may reference pre-developed or third party client-side library components (e.g., client-side "ACTIVEX" controls) to ease a given application programming effort. However, in the current server-side application frameworks, the programming required to dynamically manage client-side user interface elements (e.g., text boxes, list boxes, buttons, hypertext links, images, sounds, etc.) within server-side applications can still require sophisticated programming skills and considerable effort. An unanswered problem exists in properly encapsulating programming required to process user interface elements, so as to allow the web page developer to focus on other aspects of the web page.

More specifically, postback events and data from user interface elements are communicated from the client to the server for processing. Handling of such postback input is typically performed in custom server-side non-user-interface server components, which can require sophisticated user interface programming. It is desirable to encapsulate handling of postback input from a client-side user interface element in a server-side framework so as to simplify the programming requirements of associated non-user-interface server components.

SUMMARY OF THE INVENTION

In accordance with the present invention, the above and other problems are solved by server-side processing of postback input received from client-side user interface elements in a request from a client. Such input may include without limitation postback data and postback events generated from a web page on a client and received by a server in an HTTP request. Furthermore, a hierarchy of member server-side control objects can cooperate to process the postback input and to generate the resulting authoring language code, such as HTML. After the processing and generating operations, the server-side control object hierarchy is terminated until a subsequent request from the client.

A method of performing server-side processing of postback input received from a client and associated with a client-side user interface element is provided. The postback input is examined to determine an identifier of a target server-side control object. The target server-side control object is identified based on the identifier of the target server-side control object. The postback input is passed to the target server-side control object and processed therein.

A computer program product providing server-side processing of postback input received from a client and associated with a client-side user interface element is provided. Server-side control objects are created in a server-side control object hierarchy. The server-side control object hierarchy includes a target server-side control object associated with the client-side user interface element. The postback data is passed to the target server-side control object. The postback input received by target server-side control object is processed therein. Authoring language data is generated from the plurality of server-side control objects to define a web page for display on a client.

An embodiment of a computer program product in accordance with the present invention includes a computer program storage medium readable by a computer system and encoding a computer program for executing a computer process providing server-side processing of postback input received from a client and associated with a client-side user interface element. An alternative embodiment of a computer program product in accordance with the present invention includes a computer data signal embodied in a carrier wave by a computing system and encoding a computer program for executing a computer process for providing server-side processing of postback input received from a client and associated with a client-side user interface element.

BRIEF DESCRIPTION OF THE DRAWINGS

FIG. 4 illustrates an exemplary dynamic content resource (e.g., an ASP+ resource) in an embodiment of the present invention.

DETAILED DESCRIPTION OF THE INVENTION

An embodiment of the present invention includes server-side computer process creating one or more server-side control objects providing server-side processing of postback input. The server-side control objects logically correspond to client-side user interface elements and generate at a server the authoring language code to be used by a client-side browser to display and process a web page. The postback input may include, without limitation, postback data and postback events generated from a web page on a client and received by a server in an HTTP request. Furthermore, a hierarchy of server-side control objects can cooperate to process the postback input and to generate the resulting authoring language code, such as standard HTML or higher. Server-side events can also result from the server-side processing of postback input. In addition to processing postback input, server-side processing may include, without limitation, state management of server-side control objects and binding data to and from server-side database. After the processing and generating operations, the server-side control object hierarchy is terminated until a subsequent request is received from the client.

Figure 1:
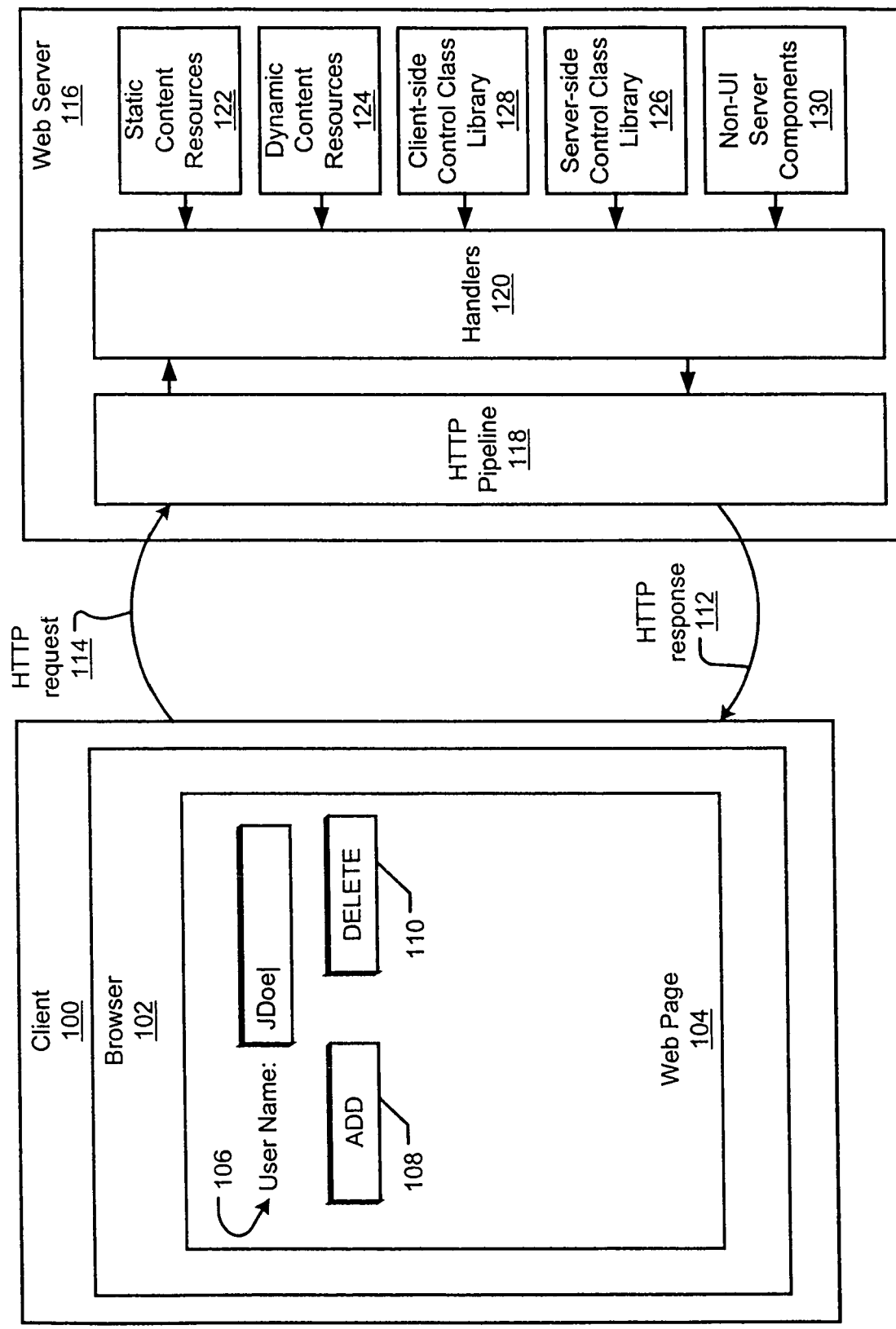
FIG. 1 illustrates a web server for dynamically generating web page content for display on a client in an embodiment of the present invention.

FIG. 1 illustrates a web server for dynamically generating web page content for display on a client in an embodiment of the present invention. A client 100 executes a browser 102 that displays a web page 104 on a display device of the client 100. The client 100 may include a client computer system having a display device, such as a video monitor. An "INTERNET EXPLORER" browser, marketed by Microsoft Corporation, is an example of a browser 102 in an embodiment of the present invention. Other exemplary browsers include without limitation "NETSCAPE NAVIGATOR" and "MOSAIC". The exemplary web page 104 includes a text box control 106 and two button controls 108 and 110. The browser 102 may receive HTML code in the HTTP response 112 from a web server 116 and displays the web page as described by the HTML code. Although HTML is described with reference to one embodiment, other authoring languages, including without limitation SGML (Standard Generalized Markup Language), XML (eXtensible Markup Language), and WML (Wireless Markup Language), which is an XML-based markup language, designed for specifying the content and user interfaces of narrowband wireless devices, such as pagers and cellular phones, are contemplated within the scope of the present invention. Furthermore, although standard HTML 3.2 is primarily disclosed herein, any version of HTML is supportable within the scope of the present invention.

The communications between the client 100 and the web server 116 may be conducted using a sequence of HTTP requests 114 and HTTP responses 112. Although HTTP is described with reference to one embodiment, other transport protocols, including without limitation S-HTTP, are contemplated within the scope of the present invention. On the web server 116, an HTTP pipeline module 118 receives an HTTP request 114, resolves the URL, and invokes an appropriate handler 120 for processing the request. In an embodiment of the present invention, a plurality of handlers 120 to handle different types of resources are provided on the web server 116.

For example, if the URL specifies a static content resource 122, such as an HTML file, a handler 120 accesses the static content resource 122 and passes the static content resource 122 back through the HTTP pipeline 118 for communication to the client 100 in an HTTP response 112. Alternatively, in an embodiment of the present invention, if the URL specifies a dynamic content resource 124, such as an ASP+ resource, a handler 120 accesses the dynamic content resource 124, processes the contents of the dynamic content resource 124, and generates the resulting HTML code for the web page 104. In an embodiment of the present invention, the resulting HTML code includes standard HTML 3.2 code. Generally, a dynamic content resource is a server-side declaration datastore (e.g., an ASP+ resource) that can be used to dynamically generate the authoring language code that describes a web page to be displayed on a client. The HTML code for the web page is then passed through the HTTP pipeline 118 for communication to the client 100 in an HTTP response 112.

During its processing, a handler 120 can also access libraries of pre-developed or third-party code to simplify the development effort. One such library is a server-side class control library 126, from which the handler 120 can instantiate server-side control objects for processing user interface elements and generating the resultant HTML data for display of a web page. In an embodiment of the present invention, one or more server-side control objects map to one or more user interface elements, visible or hidden, on the web page described in the dynamic content resource 124. More details on server-side control objects for processing client-side server interface elements are described in U.S. patent application Ser. No. 09/573,769 entitled SERVER-SIDE CONTROL OBJECTS FOR PROCESSING CLIENT-SIDE USER INTERFACE ELEMENTS, incorporated herein by reference for all it discloses and teaches, filed concurrently herewith, and assigned to the Assignee of the present invention.

A second library, in contrast, is a client-side control class library 128, such as a library including "ACTIVEX" components from Microsoft Corporation. An "ACTIVEX" control is a COM ("Component Object Model") object that follows certain standards in how it interacts with its client and other components. A client-side "ACTIVEX" control, for example, is a COM-based component that can be automatically downloaded to a client and executed by a web browser on the client. Server-side ACTIVEX components (not shown) are COM-based components that may be implemented on a server to perform a variety of server-side functions, such as providing the server-side functionality of a stock price look-up application or database component. A more detailed discussion of ACTIVEX can be found in "Understanding ACTIVEX and OLE", David Chappell, Microsoft Press, 1996.

In contrast to "ACTIVEX" controls, a server-side control object in an embodiment of the present invention, being specified in a dynamic content resource 124, logically corresponds to a user interface element that is incorporated in the web page on the client. The server-side control object can also generate valid HTML code that can include, for example, an HTML tag and a locator referencing a given client-side "ACTIVEX" control. If the browser already has the code for the client-side "ACTIVEX" control within its storage system, the browser executes the "ACTIVEX" control within the web page on the client. Otherwise, the browser downloads the code for the "ACTIVEX" control from the resource specified by the locator and then executes the "ACTIVEX" control within the web page on the client. A server-side control object in an embodiment of the present invention can also raise events to a server-side "ACTIVEX" component used to implement a stock look-up application on the server.

A handler 120 also has access to one or more non-user-interface server components 130 that execute on the web server 116 or on another accessible web server. A non-user-interface server component 130, such as a stock price look-up application or database component, may be referenced in or associated with a dynamic content resource 124 that is processed by a handler 120. Server-side events raised by the control objects declared in the dynamic content resource 124 may be processed by server-side code, which calls appropriate methods in the non-user-interface server component 130. As a result, the processing provided by the server-side control objects simplifies the programming of the non-user-interface server component 130 by encapsulating the processing and generation of the user interface elements of a web page, which allows the developer of the non-user-interface server component 130 to concentrate on the specific functionality of the application, rather than on user interface issues.

Figure 2:
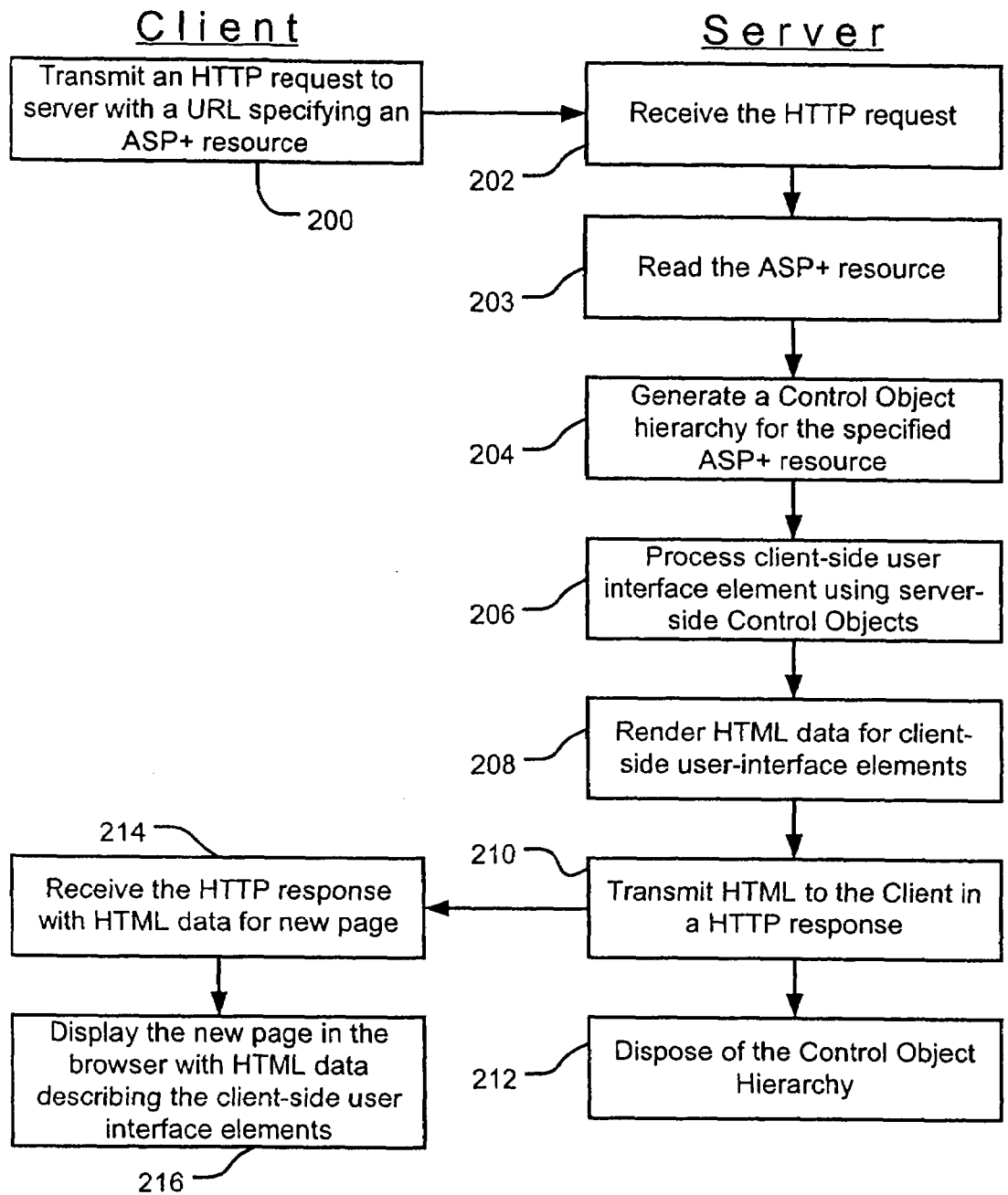
FIG. 2 illustrates a flow diagram of operations for processing and rendering client-side user interface elements using server-side control objects in an embodiment of the present invention.

FIG. 2 illustrates a flow diagram of operations for processing and generating client-side user interface elements using server-side control objects in an embodiment of the present invention. In operation 200, the client transmits an HTTP request to the server. The HTTP request includes a URL that specifies a resource, such as an ASP+ resource. In operation 202, the server receives the HTTP request and invokes the appropriate handler for processing the specified resource. The ASP+ resource is read in operation 203. Operation 204 generates a server-side control object hierarchy based on the contents of the specified dynamic content resource (e.g., the ASP+ resource).

In operation 206, the member server-side control objects of the control object hierarchy perform one or more of the following operations: postback event handling, postback data handling, state management, and data binding. Postback events and data (collectively "postback input") from user interface elements are communicated from the client to the server for processing. A postback event, for example, may include without limitation a "mouse click" event from a client-side button element or a "data change" event from a client-side textbox element that is communicated to the server. Postback data, for example, may include without limitation text entered by a user in a text box element or an index of an item selected from a drop-down box.

In operation 208, each server-side control object in the hierarchy is called to generate (or render) data, such as HTML code, for display of client-side user interface elements in the web page. Note that, although the term "render" may be used to described the operation of displaying graphics on a user interface, the "render" is also used herein to describe the operation of generating authoring language data that can be interpreted by a client application, such as a browser, for display and client-side functionality. A more detailed discussion of the processing operation 206 and the rendering operation 208 is provided in association with FIG. 6. In one embodiment, calls to render( ) methods in individual control objects are performed using a tree traversal sequence. That is, a call to the render( ) method of a page object results in recursive traversal throughout appropriate server-side control objects in the hierarchy. Alternative methods for calling the render( ) methods for appropriate control objets may also be employed, including an event signaling or object registration approach. The parentheses designate the "render( )" label as indicating a method, as compared to a data value.

In an embodiment of the present invention, the actual creation of the individual server-side control objects may be deferred until the server-side control object is accessed (such as when handling postback input, loading a state, rendering HTML code from the control object, etc.) in operations 206 or 208. If a server-side control object is never accessed for a given request, deferred control object creation optimizes server processing by eliminating an unnecessary object creation operation.

Operation 210 transmits the HTML code to the client in an HTTP response. In operation 214, the client receives the HTML code associated with a new web page to be displayed. In operation 216, the client system incorporates (e.g., displays) the user interface elements of the new page in accordance with the HTML code received from the HTTP response. It should be understood, however, that incorporation of a user-interface element may include non-display operations, such as providing audio or tactile output, reading and writing to memory, controlling the operation of scripts, etc. In operation 212, the server-side control object hierarchy is terminated. In one embodiment of the present invention, server-side control objects in the hierarchy are created in response to an HTTP request referencing an associated ASP+ resource, and destroyed subsequent to the rendering of authoring language data (e.g., HTML data). In an alternative embodiment, operation 212 may be performed after operation 208 and before operation 210.

Figure 3:
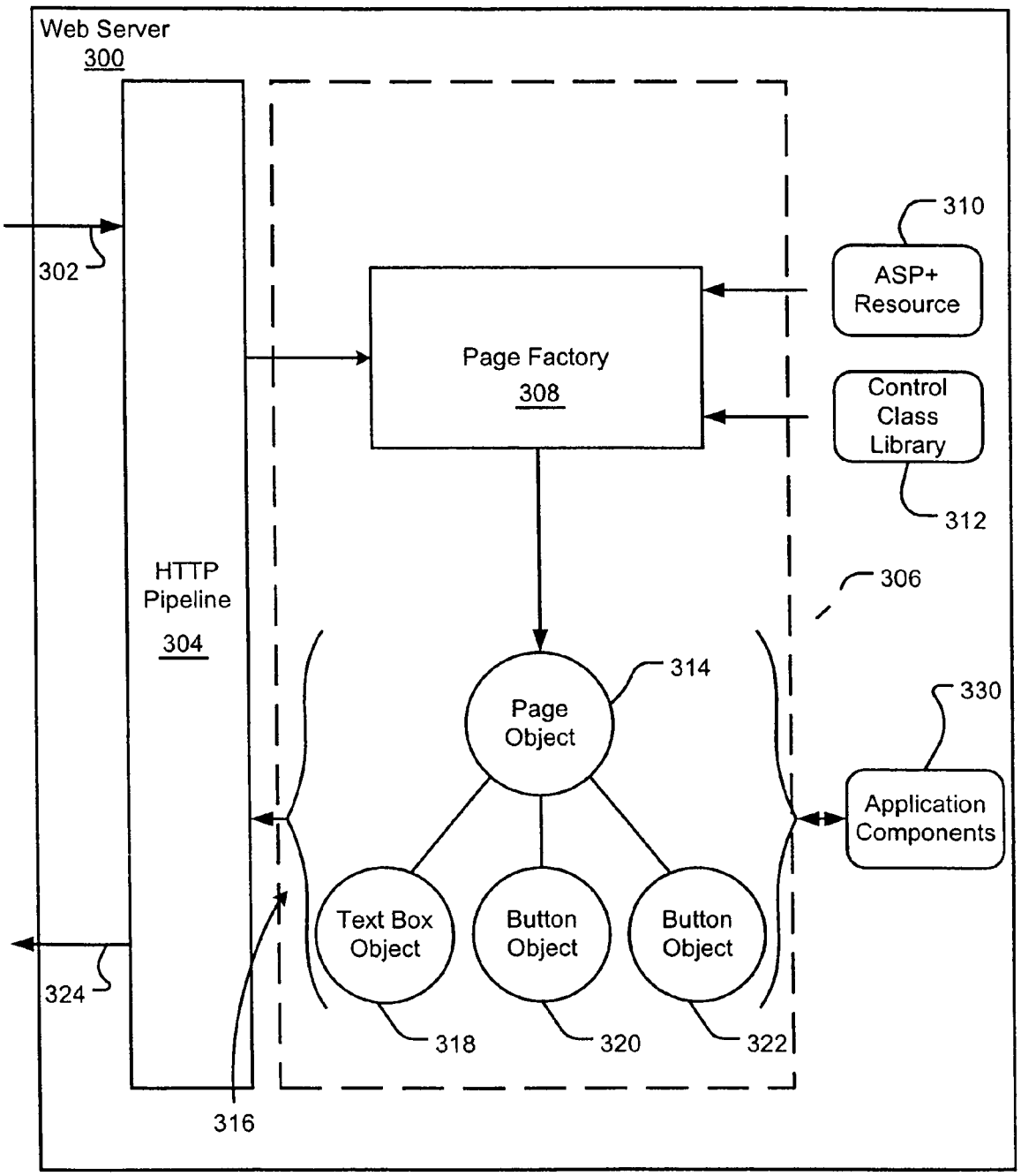
FIG. 3 illustrates exemplary modules in a web server used in an embodiment of the present invention.

FIG. 3 illustrates exemplary modules in a web server used in an embodiment of the present invention. The web server 300 receives an HTTP request 302 into the HTTP pipeline 304. The HTTP pipeline 304 may include various modules, such as modules for logging of web page statistics, user authentication, user authorization, and output caching of web pages. Each incoming HTTP request 302 received by the web server 300 is ultimately processed by a specific instance of an IHTTPHandler class (shown as handler 306). The handler 306 resolves the URL request and invokes an appropriate handler factory (e.g., a page factory module 308).

In FIG. 3, a page factory module 308 associated with the ASP+ resource 310 is invoked to handle the instantiation and configuration of the ASP+ resource 310. In one embodiment, an ASP+ resource 310 can be identified by designating a particular suffix (or file extension such as ".aspx") with a resource. When a request for a given ".aspx" resource is first received by the page factory module 308, the page factory module 308 searches the file system for the appropriate text file (e.g., the .aspx file 310). The file may contain text (e.g., authoring language data) or another data format (e.g., bytecode data or encoded data) that may later be interpreted or accessed by the server to service the request. If the physical file exists, the page factory module 308 opens the file and reads the file into memory. If the file cannot be found, the page factory module 308 returns an appropriate "file not found" error message.

After reading the ASP+ resource 310 into memory, the page factory module 308 processes the file content to build a data model of the page (e.g., lists of script blocks, directives, static text regions, hierarchical server-side control objects, server-side control properties, etc.). The data model is used to generate a source listing of a new object class, such as a COM+ ("Component Object Model") class, that extends the page base class. The page base class includes code that defines the structure, properties, and functionality of a basic page object. In an embodiment of the present invention, the source listing is then dynamically compiled into an intermediate language and later Just-In-Time compiled into platform native instructions (e.g., X86, Alpha, etc.). An intermediate language may include general or custom-build language code, such as COM+ IL code, Java bytecodes, Modula 3 code, SmallTalk code, and Visual Basic code. In an alternative embodiment, the intermediate language operations may be omitted, so that the native instructions are generated directly from the source listing or the source file (e.g., the ASP+ resource 310). A control class library 312 may be accessed by the page factory module 308 to obtain predefined server-side control classes used in the generation of the control object hierarchy.

The page factory module 308 outputs a page object 314, which is a server-side control object that corresponds to the web page 104 of FIG. 1. The page object 314 and its children (i.e., a text box object 318, a button object 320, and another button object 322) comprise an exemplary control object hierarchy 316. Other exemplary control objects are also contemplated in accordance with the present invention, including without limitation objects corresponding to the HTML controls in Table 1, as well as custom control objects. The page object 314 logically corresponds to the web page 104 of FIG. 1. The text box object 318 logically corresponds to the text box 106 in FIG. 1. Likewise, the button object 320 logically corresponds to the add button 108 in FIG. 1, and the button object 322 corresponds to the delete button 110 in FIG. 1. The page object 314 is hierarchically related to other control objects on the server. In one embodiment, a page object is a container object that hierarchically contains its children control objects. In an alternative embodiment, other forms of hierarchical relation may be employed, including a dependency relationship. In a more complex control object hierarchy with multiple levels of children, a child object can be a container object for other child objects.

In the illustrated embodiment, the control objects in the control object hierarchy 316 are created and executed on the server 300, and each server-side control object logically corresponds to a user interface element on the client. The server-side control objects also cooperate to handle postback input from the HTTP request 302, to manage the states of server-side control objects, to perform data binding with server-side databases, and to generate authoring language data (e.g., HTML code) used to display a resulting web page at the client. The resulting authoring language data is generated (i.e., rendered) from the server-side control object hierarchy 316 and transmitted to the client in an HTTP response 324. For example, resulting HTML code may embody any valid HTML construct and may reference ACTIVEX-type control, JAVA applets, scripts, and any other web resources that yield client-side user interface elements (e.g., control buttons, text boxes, etc.) when processed by a browser.

By virtue of declarations made in the ASP+ resource 310, server-side control objects may also access one or more non-user-interface server components 330 to provide interaction between the non-user-interface server component 330 and client-side user interface elements. For example, in response to postback input, server-side control objects can raise server-side events to server-side code registered for those events. The server-side code may be developed by the page developer and designated with the "runat=server" attribute. In turn, the server-side code calls methods in the non-user-interface server component 330. In this manner the non-user-interface server component 330 can interact with the user through client-side user interface elements without programming the code required to display and process these elements.

FIG. 4 illustrates contents of an exemplary dynamic content resource in an embodiment of the present invention. In the illustrated embodiment, the file 400 contains plain-text declarations in an exemplary dynamic content resource format (e.g., ASP+). Each declaration provides instructions to a page compiler that reads the file 400, creates and invokes the appropriate server-side control objects, and ultimately combines the rendered HTML code for transmission to the client in an HTTP response.

The first line of the file 400 includes a directive in the format:

<%@directive {attribute=value} %> where directive may include without limitation "page", "cache", or "import". Directives are used by the page compiler when processing a dynamic content resource to determine such characteristics as buffering semantics, session state requirements, error handling schemes, scripting languages, transaction semantics, and import directions. Directives may be located anywhere within a page file. For more details about the page compiler, see U.S. patent application Ser. No. 09/09/573,768 entitled SERVER-SIDE CODE GENERATION FROM A DYNAMIC WEB PAGE CONTENT FILE, filed concurrently herewith and assigned to the Assignee of the present application.

In the second line, <html> is a standard HTML starting tag, which is passed through to the resulting HTML code as a literal (i.e., without additional processing to render the resulting HTML code). In HTML, the <html> indicates the beginning of the HTML file and is paired with the closing tag on line 21, </html>, which is also a literal.

A code declaration block is located at lines 3–10 of the file 400. Generally, server-side code declaration blocks define page object and control object member variables and methods that are executed on the server. In the format:

```
<script runat = "server" [language = "language"][src = "externalfile"]>
    .................................
</script>
``` where the language and src parameters are optional. In an embodiment of the present invention, code declaration blocks are defined using <script> tags that contain a "runat" attribute having a value set to "server". Optionally, a "language" attribute may be used to specify the syntax of the inner code. The default language may represent the language configuration of the overall page; however, the "language" attribute in the code declaration block allows a developer to use different languages within the same web page implementation including, for example, Jscript and PERL (Practical Extraction and Report Language). The <script> tag may also optionally specify a "src" file, which is an external file from which code is inserted into the dynamic content resource for processing by the page compiler. It should be understood that the disclosed syntax is used in one embodiment, however, alternative embodiments may employ different syntaxes within the scope of the present invention.

In FIG. 4, two subroutines are declared in Visual Basic format within the code declaration block: AddButton_Click and DeleteButton_Click. Both subroutines take two input parameters, "Source" and "E", and are executed on the server in response to an HTTP request when a client-side click event is detected on the corresponding button. In the AddButton_Click subroutine, the text in a UserName text box is concatenated on to the word "Add" and loaded into the Text data member of Message. In the DeleteButton_Click subroutine, the text in the UserName text box is concatenated on to the word "Delete" and loaded into the Text data member of Message. Although not shown in FIG. 4, member variables of server-side control objects may be declared in the code declaration block of the file 400. For example, using a Visual Basic syntax, the key word space "DIM" declares a data variable of a server-side control object.

A "code render block" (not shown) can also be included in a dynamic content resource. In an embodiment of the present invention, a code render block executes in a single "rendering" method that executes at page render time. A code render block satisfies the following format (although other formats are contemplated in alternative embodiments):

<% InlineCode %> where InlineCode includes self-contained code blocks or control flow blocks that execute on the server at page render time.

Inline expressions may also be used within a code render block, using the exemplary syntax:

<%=InlineExpression %> where the expression contained in an InlineExpression block is ultimately encompassed by a call to "Response.Write(InlineExpression)" in a page object, which writes the value resulting from InlineExpression into an appropriate place holder in the declaration. For example, InlineExpressions may be included in a code render block as follows:

<font size="<%=x%>"> Hi <%=Name %>, you are <%=Age %>!</font> which outputs a greeting and a statement about a person's age in a font stored in the value "x". The person's name and age are defined as strings in a code declaration block (not shown). The resulting HTML code is rendered at the server for transmission to the client in the HTTP response so as to include the values of the InlineExpressions at appropriate locations:

<font size="12"> Hi Bob, your are 35!

On line 11 of file 400, <body> is a standard HTML tag for defining the beginning of the body of the HTML document. On line 20 of file 400, the closing tag, </body>, is also shown. Both the <body> and </body> are literals in an embodiment of the present invention.

Within the body section of the HTML file 400, on line 12, the starting tag, <form>, of an HTML form block is found in FIG. 4. The ending tag, </form>, of the form block is found on line 19 of the HTML file 400. An optional parameter "id" may also be included in the HTML control tag, <form>, to associate a given identifier with the form block, thereby allowing multiple form blocks to be included in a single HTML file.

On line 18 of file 400, a server-side label, identified by "Message", is declared. The "Message" label is used in the code declared at lines 5 and 8 of the file 400 to display a label on the web page.

Within a form block, three exemplary HTML control tags are shown, corresponding to the user interface elements 106, 108, and 110 of FIG. 1. The first user interface element is declared on line 13 of the file 400 corresponding to a textbox. The text literal "User Name:" declares a label positioned to the left of the textbox. The input tag with type="Text" declares a textbox server-side control object having an id equaling "UserName" as a server-side control object that renders a textbox client-side user interface element. Lines 15 and 16 of file 400 declare the client-side user interface elements shown as buttons 108 and 110 of FIG. 1, respectively. Note that the "OnServerClick" parameter specifies the appropriate sub-routine declared in the code declaration block of the file 400. As such, the server-side button control objects generated in response to the declarations in file 400 render the HTML code for the client-side buttons and an associated server-side script for implementing the button click events.

The textbox and buttons declared in file 400 are examples of HTML server control declarations. By default, all HTML tags within an ASP+ resource are treated as literal text content and are programmatically inaccessible to page developers. However, page authors can indicate that an HTML tag should be parsed and treated as an accessible server control declaration by marking it with a "runat" attribute with a value set to "server". Each server-side control object may optionally be associated with a unique "id" attribute to enable programmatic referencing of the corresponding control object. Property arguments and event bindings on server-side control objects can also be specified using declarative name/value attribute pairs on the tag element (e.g., the OnServerClick equals "MyButton_Click" pair.

In an embodiment of the present invention, a general syntax for declaring HTML control objects is as follows:

<HTMLTag id = "Optional Name" runat = server>
......................................
</HTMLTag> where the OptionalName is a unique identifier for the server-side control object. A list of currently supported HTML tags and the associated syntax and COM+ class are illustrated in TABLE 1, although other HTML tags are contemplated within the scope of the present invention.

In addition to standard HTML control tags, an embodiment of the present invention enables developers to create re-usable components that encapsulate common programmatic functionality outside of the standard HTML tag set. These custom server-side control objects are specified using declarative tags within a page file. Custom server-side control object declarations include a "runat" attribute with a value set to "server". Optionally, the unique "id" attribute may be specified to enable programmatic referencing of the custom control object. In addition, declarative name/value attribute pairs on a tag element specify property arguments and event bindings on a server-side control object. In-line template parameters may also be bound to a server-side control object by providing an appropriate "template" prefix child-element to the parent server control object. A format for a custom server-side control object declaration is:

<servercntrlclassname id="OptionalName"
    [propertyname="propval"] runat=server/> where servercntrlclassname is a name of an accessible server control class, OptionalName is a unique identifier of the server-side control object, and propval represents an optional property value in the control object.

Using an alternative declaration syntax, XML tag prefixes may be used to provide a more concise notation for specifying server-side control objects within a page, using the following format:

<tagprefix:classname id="OptionalName"
    runat=server/> where tagprefix is associated with a given control name space library and classname represents a name of a control in the associated name space library. An optional propertyvalue is also supported.

TABLE 1

| HTML Tag Name | Example | COM+ Class |
| --- | --- | --- |
| <a> | <a id = "MyAnchor" runat = server> My Link </a> | AnchorButton |
| <img> | <img id = "MyImage" runat = server> | Image |
| <span> | <span id = "MyLabel" runat = server> </span> | Label |
| <div> | <div id = "MyDiv" runat = server>Some contents</div> | Panel |
| <form> | <form id = "MyForm" runat = server> </form> | FormControl |
| <select> | <select id = "MyList" runat = server><br>   <option>One</option><br>   <option>Two</option><br>   <option>Three</option><br></select> | DropDownList |
| <input type = file> | <input id = "MyFile" type = file runat = server> | FileInput |
| <input type = text> | <input id = "MyTextBox" type = text> | TextBox |
| <input type = password> | <input id = "MyPassword" type = password> | TextBox |
| <input type = reset> | <input id = "MyReset" type = reset> | Button |
| <input type = radio> | <input id = "MyRadioButton" type = radio runat = server> | RadioButton |
| <input type = checkbox> | <input id = "MyCheck" type = checkbox runat = server> | CheckBox |
| <input type = hidden> | <input id = "MyHidden" type = hidden runat = server> | HiddenField |
| <input type = image> | <input type = image src = "foo.jpg" runat = server> | ImageButton |
| <input type = submit> | <input type = submit runat = server> | Button |
| <input type = button> | <input type = button runat = server> | Button |
| <button> | <button id = MyButton runat = server> | Button |
| <textarea> | <textarea id = "MyText" runat = server> This is some sample text </textarea> | TextArea |

In summary, an embodiment of the present invention includes server-side control objects that are created and executed on the server to generate HTML code that is sent to a client. The HTML code may, for example, embody any valid HTML constructs and may reference ACTIVEX-type controls, JAVA applets, scripts, and any other web resources to produce user interface buttons and other user interface elements at the client. A user at the client may interact with these user interface elements, which logically correspond to the server-side control objects, and send a request back to the server. The server-side control objects are recreated on the server to process the data, events, and other characteristics of the user interface elements so as to generate the next round of HTML code to be transmitted in a response to the client.

Figure 5:
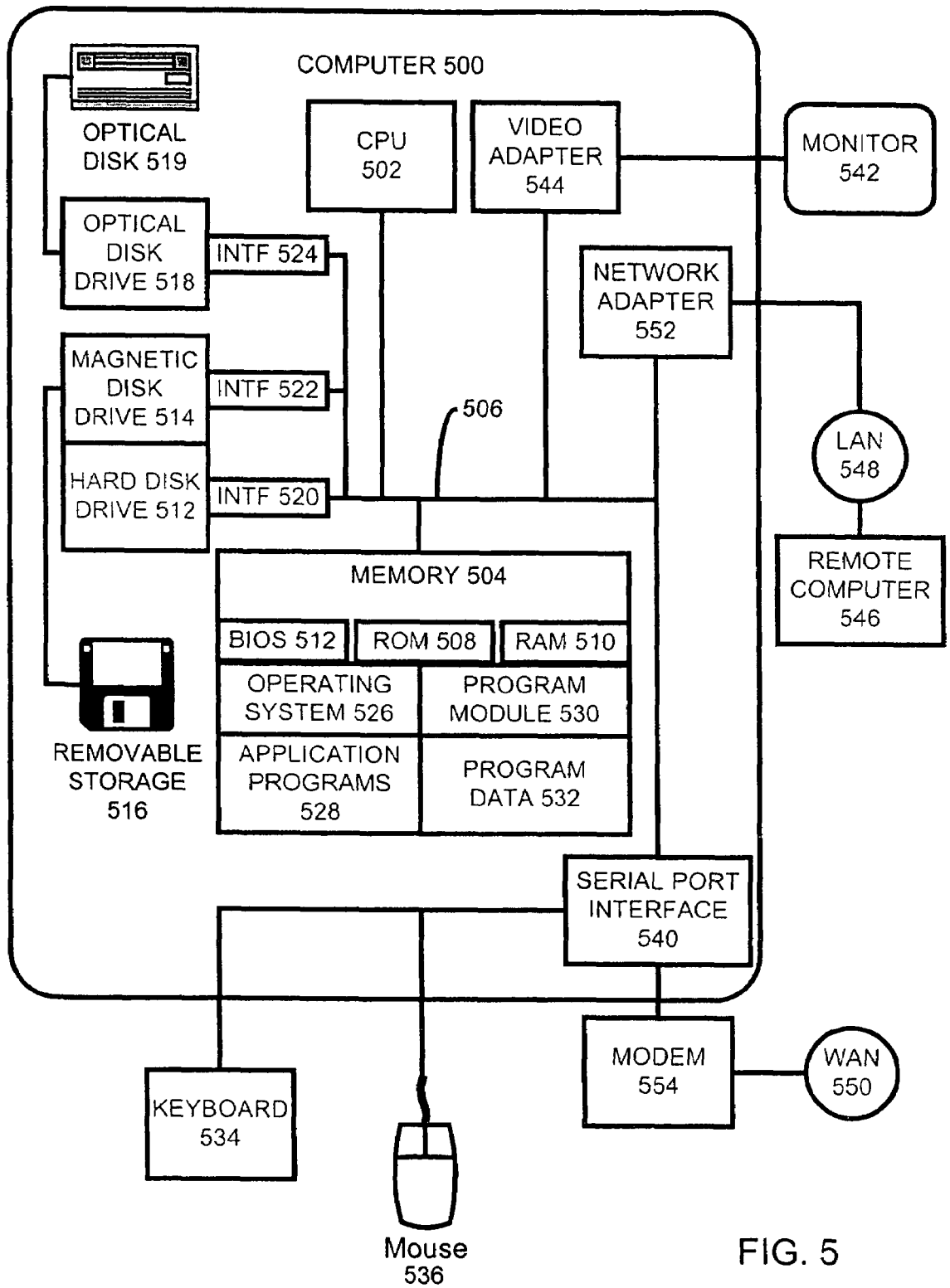
FIG. 5 illustrates an exemplary system useful for implementing an embodiment of the present invention.

With reference to FIG. 5, an exemplary computing system for embodiments of the invention includes a general purpose computing device in the form of a conventional computer system 500, including a processor unit 502, a system memory 504, and a system bus 506 that couples various system components including the system memory 504 to the processor unit 500. The system bus 506 may be any of several types of bus structures including a memory bus or memory controller, a peripheral bus and a local bus using any of a variety of bus architectures. The system memory includes read only memory (ROM) 508 and random access memory (RAM) 510. A basic input/output system 512 (BIOS), which contains basic routines that help transfer information between elements within the computer system 500, is stored in ROM 508.

The computer system 500 further includes a hard disk drive 512 for reading from and writing to a hard disk, a magnetic disk drive 514 for reading from or writing to a removable magnetic disk 516, and an optical disk drive 518 for reading from or writing to a removable optical disk 519 such as a CD ROM, DVD, or other optical media. The hard disk drive 512, magnetic disk drive 514, and optical disk drive 518 are connected to the system bus 506 by a hard disk drive interface 520, a magnetic disk drive interface 522, and an optical drive interface 524, respectively. The drives and their associated computer-readable media provide nonvolatile storage of computer readable instructions, data structures, programs, and other data for the computer system 500.

Although the exemplary environment described herein employs a hard disk, a removable magnetic disk 516, and a removable optical disk 519, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 516, optical disk 519, ROM 508 or RAM 510, including an operating system 526, one or more application programs 528, other program modules 530, and program data 532. A user may enter commands and information into the computer system 500 through input devices such as a keyboard 534 and mouse 536 or other pointing device. Examples of other input devices may include a microphone, joystick, game pad, satellite dish, and scanner. These and other input devices are often connected to the processing unit 502 through a serial port interface 540 that is coupled to the system bus 506. Nevertheless, these input devices also may be connected by other interfaces, such as a parallel port, game port, or a universal serial bus (USB). A monitor 542 or other type of display device is also connected to the system bus 506 via an interface, such as a video adapter 544. In addition to the monitor 542, computer systems typically include other peripheral output devices (not shown), such as speakers and printers.

The computer system 500 may operate in a networked environment using logical connections to one or more remote computers, such as a remote computer 546. The remote computer 546 may be a computer system, a server, a router, a network PC, a peer device or other common network node, and typically includes many or all of the elements described above relative to the computer system 500. The network connections include a local area network (LAN) 548 and a wide area network (WAN) 550. Such networking environments are commonplace in offices, enterprise-wide computer networks, intranets, and the Internet.

When used in a LAN networking environment, the computer system 500 is connected to the local network 548 through a network interface or adapter 552. When used in a WAN networking environment, the computer system 500 typically includes a modem 554 or other means for establishing communications over the wide area network 550, such as the Internet. The modem 554, which may be internal or external, is connected to the system bus 506 via the serial port interface 540. In a networked environment, program modules depicted relative to the computer system 500, or portions thereof, may be stored in the remote memory storage device. It will be appreciated that the network connections shown are exemplary, and other means of establishing a communication link between the computers may be used.

In an embodiment of the present invention, the computer 500 represents a web server, wherein the processor 502 executes a page factory module on an ASP+ resource stored on at least one of storage media 516, 512, 514, 518, 519, or memory 504. HTTP responses and requests are communicated over the LAN 548, which is coupled to a client computer 546.

Figure 6:
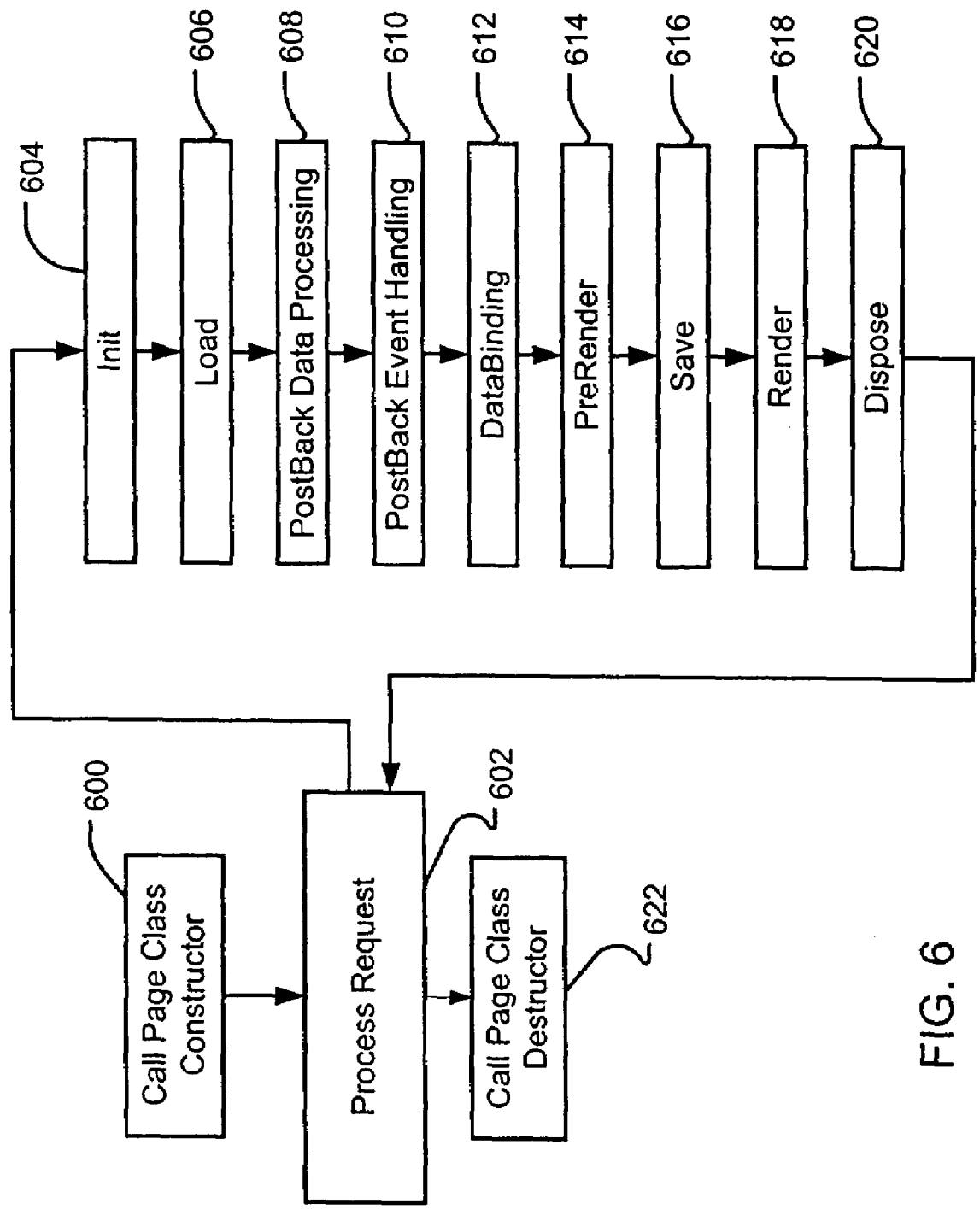
FIG. 6 illustrates a process flow diagram representing processing of a page object in an embodiment of the present invention.

FIG. 6 illustrates a process flow diagram representing server-side processing of a page object and other control objects in an embodiment of the present invention. In operation 600, a page object constructor is called by the page factory module 308 (see FIG. 3). As a result, a page object (see e.g., the page object 314 in FIG. 3) is created to logically correspond to the client-side user interface element on the client. In operation 602, the page factory module calls the ProcessRequest member function of the page object, which initiates the staged operations for processing the HTTP request received from a client. In a first stage of one embodiment of the present invention, a server-side Create operation (not shown) creates the descendant server-side control objects contained in the control object hierarchy of the page object, that is, constructors for child control objects are recursively called to create the control objects during the lifetime of the processing of the HTTP request processing.

In an alternate embodiment, however, creation of child control objects is deferred until the control object is required for a given processing step (e.g., handling a postback event, handling postback data, loading or saving a viewstate, resolving data binding, or rendering HTML code for the corresponding user interface element). The latter embodiment, which is said to implement "deferred control object creation", is an optimization that can alleviate unnecessary CPU and memory utilization. For example, a user input event received from the client may result in the creation of a completely different web page. In this case, it is unnecessary to instantiate an entire control object hierarchy of the previous page only to process an event that immediately results in the termination of the control object hierarchy and the instantiation of a new and different control object hierarchy for a new page.

In response to the server call to the page object's Process-Request method, operation 604 through 620 may be executed by the page object and by individual descendant control objects, depending in part on the data of a given HTTP request. In an embodiment of the present invention, the operation 604–620 are performed for each individual object in the order illustrated in FIG. 6; however, a given operation for one object may occur out of order or not at all with respect to a given operation of another object, depending on the HTTP request. For example, a first object may perform its Init operation 604 and its Load operation 606, and begin postback data processing operation 608, before a descendant control object performs its own Init operation 604 and Load operation 606 by virtue of deferred control object creation. The order of operation processing by the page object and descendent control objects depends on various factors, including without limitation the nature of the data in the HTTP request, the configuration of the control object hierarchy, the current state of the control objects, and whether deferred control object creation is implemented.

The Init operation 604 initializes a control object after it is created by executing any server-side code associated with initialization in the dynamic content resource. In this manner, each server-side control object may be customized with specific server-side functionality that is declared in the dynamic content resource. In an embodiment of the present invention, dynamic content code intended to customize or extend the base page control classes as declared by the page developer in the ASP+ resource on the server. When the ASP+ resource is compiled, the declared code is included in the appropriate initialization code (e.g., the Init( ) methods of the page object and the descendent control objects). The Init operation 604 executes this code to customize or extend the page base class and the base classes for descendent control objects.

In an embodiment of the present invention, state management of the server-side control objects is supported in a Load operation 606 and a Save operation 616, which use a transportable state structure to accommodate the stateless model for client server systems by restoring server-side control objects to their previous states. In one embodiment, the state is communicated to and from the server in one or more hidden HTML fields of an HTTP request/response pair, although other transportable state structures are contemplated within the scope of the present invention.

In a given sequence of requests and responses relating to the current page between a client and a server, the states of one or more control objects are recorded into a transportable state structure by the Save operation 616 after the processing of a previous request. In an embodiment of the present invention, additional state information is also included in the transportable state structure, including hierarchical information or control object identifiers to allow the server to associate a given state with the appropriate control object. In a subsequent HTTP request, the state information is returned to the server in the transportable state structure. The server extracts the state information from the received transportable state structure and loads the state data into the appropriate control objects within the control object hierarchy to restore each control object to its state as it existed prior to a previous HTTP response. After the current request is processed, the states of one or more server-side control objects are again recorded into the transportable state structure by the Save operation 616, and the transportable state structure is returned to the client in the next HTTP response.

As a result of the Load operation 606, each server-side control object is placed in a state consistent with its state prior to a previous HTTP response. For example, if a text box control object includes a property value equaling "JDoe" prior to a previous HTTP response, the Load operation 606 restores the same control object to its previous state, in part by loading the text string "JDoe" into the property value. In addition, whether the state of a given object is stored and restored is configurable.

In summary of one embodiment of the present invention, the state of one or more server-side control objects is "saved" after processing. The saved state information is transmitted to the client in a response. The client returns the saved state information to the server in a subsequent response. The server loads the state information a freshly instantiated server-side control object hierarchy, such that the state of the hierarchy is restored to its previous state. More details on state management can be found in U.S. patent application Ser. No. 09/574,144, entitled STATE MANAGEMENT OF SERVER_SIDE CONTROL OBJECTS, incorporated herein by reference for all that it discloses and teaches, filed concurrently herewith, and assigned to the Assignee of the present application.

An alternative embodiment may maintain the state information on the server or at some other web location accessible by the server during the round trip from the server to the client, and then back to the server. After the client request is received by the server, this state information may be retrieved by the server and loaded into the appropriate server-side control object(s) in the control object hierarchy.

In operation 608, postback data received from the HTTP request is processed. Postback data may be included in the payload of the HTTP request in key-value pairs, in a hierarchical representation (e.g., XML), or in other data representations, such as RDF ("Resource Description Framework"). Operation 608 parses the payload to identify a unique identifier of a target server-side control object. The target server-side control object can be nested within an arbitrary hierarchy. If the identifier (e.g. "page1:list1:listrow2:text1") is found and the corresponding target server-side control object exists in the control object hierarchy, the received postback data is passed to the control object. For example, referring to FIG. 1, a unique identifier associated with textbox 106 and the text "JDoe" are communicated in the payload of the HTTP request 114 to the web server 116. Operation 608 parses the payload of the HTTP request 114 and obtains the unique identifier of the textbox 106 and its associated value (i.e., "JDoe"). Operation 608 then resolves the unique identifier of the textbox 106 to identify the corresponding target server-side control object and passes the "JDoe" value to the target object for processing.

As discussed with regard to the Load operation 606, the property values of server-side control objects may be restored to their previous states. In response to the receipt of postback data, the server-side control object determines whether the passed-in value causes a change from its corresponding property's previous value. If so, the change is logged in a change list to indicate a data change for the associated control object. After all postback data has been processed within the control object hierarchy, a call may be made to a control object method to raise one or more postback data changed events to one or more non-user-interface server components, such as a stock price look-up application running on the server. An example of a postback data changed event is an event indicating that postback data has causes a property of a server-side control object to change. In an exemplary embodiment, such an event can be sent to a system-provided event queue so that server-side code, which may be registered to process the event, can be invoked. The server-side code may then call a method of the non-user-interface server component. In this manner, the server-side non-user-interface server component can respond to events triggered by a change in data of a control object. Alternative methods of implementing events are also contemplated in the scope of the present invention, including using application-provided event queues, polling, and processing interrupts.

In operation 610, postback events are handled. In one embodiment, a postback event is communicated to the server in an event structure recorded in a query string. For example, at least two intrinsic HTML tag elements—"<input type=submit>" and "<input type=image>"—cause their containing form to be submitted to the server when the element is "clicked" by a mouse. Two exemplary button element are declared by the following HTML code:

```
<form action="Foo.aspx" method="GET">
    Name: <input type="text" name="scott">
    <input type=submit name="Button1"> | <input type=submit name="Button2">
</form>
```

If "Button1" is clicked, the query string "Foo.aspx?name=scott&Button1" is posted to the server. If "Button2" is clicked, the query string "Foo.aspx?name=scott&Button2" is posted to the server.

In an alternative embodiment, postback events are recorded known hidden fields in the payload of the HTTP request. The embodiment is particularly useful when an HTML element is not capable of generating form submits back to the server. Instead, a client-side script is invoked to populate an event structure in the payload of the HTTP request.

Operation 610 parses a specified event target identifying the server-side control object to which the event is directed. In one embodiment, the specified event is recorded in the query string. In another embodiment, the specified event is recorded in a hidden field in the HTTP request (e.g., labeled "_EVENTTARGET" in an embodiment of the present invention). Alternative embodiments may employ other event structures (e.g., visible fields, remote resources, etc.) to be parsed in operation 610.

Furthermore, in an embodiment of the present invention, operation 610 parses event arguments, if any, and provides the event arguments (e.g., labeled "_EVENTARGUMENT" in an embodiment of the present invention) to the specified server-side control object. The server-side control object raises its events for processing by another server-side control object or by other server-side code, which can call a method of a non-user-interface server component (e.g., a server-side stock price look-up application) associated with the dynamic content resource.

Operation 612 resolves data binding relationships between the server-side control objects and one or more databases accessible by the server, thereby updating in control object properties with database values and/or updating database fields with values of control object properties. In an embodiment of the present invention, properties of server-side control objects may be associated (or data bound) to properties of a parent data binding container, such as a table in a server-side application database. During the data binding operation 612, the page framework may update a data bound control object property with the value of the corresponding parent data binding container property. In this manner, user interface elements on the web page of the next response accurately reflect updated property values, because the control object properties to which the user interface elements correspond have been automatically updated during the data binding operation 612. Likewise, control object properties can also be updated to the parent data binding container fields, thereby updating a server-side application database with postback input from a server-side control object. More details regarding data binding using server-side control objects can be found in U.S. patent application Ser. No. 09/09/573,656, entitled DATABINDING USING SERVER-SIDE CONTROL OBJECTS, incorporated herein by reference for all that it discloses and teaches, filed concurrently herewith, and assigned to the Assignee of the present application.

Operation 614 performs miscellaneous update operations that may be executed before the control object state is saved and the output is rendered. Operation 616 requests state information (i.e., viewstate) from one or more control objects in the control object hierarchy and stores the state information for insertion into a transportable state structure that is communicated to the client in the HTTP response payload. For example, a "grid" control object may save a current index page of a list of values so that the "grid" control object may be restored to this state after a subsequent HTTP request (i.e., in operation 606). As described above, the viewstate information represents the state of the control object hierarchy prior to any subsequent actions by the client. When the viewstate information is returned, it will be used to place the control object hierarchy in that previous state prior to processing any client postback input or databinding.

The render operation 618 generates the appropriate authoring language output (e.g., HTML data) for communication to the client in an HTTP response. Rendering is accomplished through a top-down hierarchical tree walk of all server-side control objects and embedded rendering code. Operation 620 performs any final cleanup work (e.g., closing files or database connections) before the control object hierarchy is terminated. Processing then returns to operation 602 and proceeds to operation 622 where the page object is terminated by calling its destructor.

Figure 7:
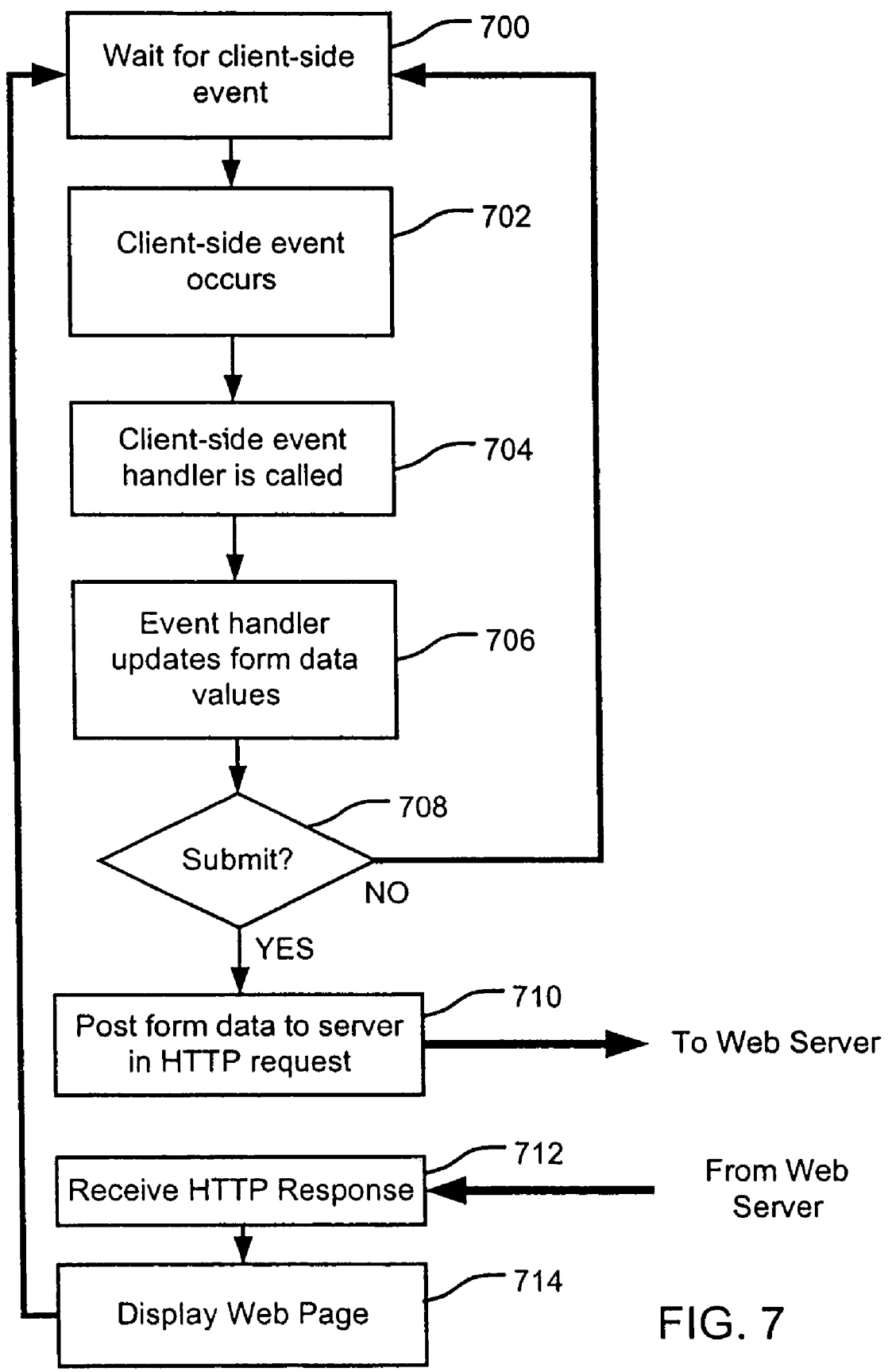
FIG. 7 illustrates a flow diagram of client-side operations relating to processing postback input in an embodiment of the present invention.

FIG. 7 illustrates a flow diagram of client-side operations relating to processing postback input (e.g., postback data and postback events) in an embodiment of the present invention. When a user interacts with a web page at a client, the user is often presented with client-side user interface elements, such as text boxes, buttons, scroll boxes, etc., in the displayed web page. In an embodiment of the present invention, some client-side user interface elements accept client-side data input or raise client-side events. A client-side text box in a web page, for example, typically receives text data input by a user (see the text data "JDoe" entered into the text box 106 of FIG. 1) for transmission to a web server in an HTTP request. Such transmitted data is referred to herein as "postback data".

The client-side text box can also be configured to raise a client-side event. For example, a client-side "data changed event" can be raised if the text data entered therein causes the text box data property or value to change from its previous value on the client. A client-side event handler, which may be written in a scripting language, may be called to process the client-side event. Client-side events can, but need not, result in a postback event. In an embodiment of the present invention, the client-side event handler can invoke a postback event by populating event structures (e.g., _EVENTTARGET and _EVENTARGUMENT or the query string) associated with the appropriate user interface element and calling a submit( ) method. The submit( ) method causes postback data and postback events (i.e., in the form of the event parameters) to be inserted into the payload of an HTTP request, which is transmitted to the web server. While the exemplary user interface element in this discussion was a text box, other user interface elements also generate postback data or postback events including, without limitation, list boxes, buttons, check boxes, and scroll boxes.

Postback data and events may be communicated from the client to the web server in an HTTP request. The format of an exemplary HTTP request consists of:
an initial line;
zero or more header lines;
a blank line (e.g., a carriage return/line feed character); and
an optional message body or payload.

As defined in the HTTP standard, the initial request line in an HTTP request includes three parts, separated by spaces: (1) an HTTP method name; (2) the local path of the requested resource (e.g., an HTML file, a ASP+ resource, etc.), and (3) the version of HTTP being used. The local path is also called a request URI ("Uniform Resource Identifier"), which is a generic term referring to various types of names and addresses that refer to objects on the worldwide web. A URL is a kind of URI. Possible HTTP methods include without limitation GET, HEAD, and POST. The GET method indicates that the specified resource is being requested and presents all postback data to the web server in the environment variable QUERY_STRING in the HTTP request payload. The HEAD method is similar to a GET method, except it asks the server to return the response headers only, and not the actual resource (i.e., no message body). The POST method indicates that the specified resource is being requested and presents all postback data to the web server in the HTTP request payload.

In an embodiment of the present invention, postback data and postback events are communicated to the web server using key-value pairs that follow a unique naming convention (e.g., the postback input values are associated with unique hierarchical keys). The hierarchical key (e.g., "/Page1/List1/ListRow2") identifies an associated server-side control object corresponding to the client-side user interface that sourced the postback input. A postback data value or event argument is then associated with the unique key. In this manner, the web server can distribute the postback data and events to the appropriate server-side control object in the control object hierarchy.

In the illustrated flow of FIG. 7, waiting operation 700 waits for a client-side event, which may include, without limitation, a "data changed event" (caused by a change in a data value of a client-side user interface element), a button click, a scroll operation, etc. In detecting operation 702, the client-side event is detected by a handler. In handling operation 704, a client-side handler (e.g., a client-side script module) is invoked to handle the client-side event. In processing operation 706, the event handler performs appropriate processing, such as storing new input data into form data values. For client-side events relating to postback data changes, the form data values associated with the given user interface element are updated.

For client-side events relating to postback events, the event structures, such as _EVENTTARGET and _EVENTARGUMENT, associated with a given server-side control object are updated. It should be understood that hidden fields are employed in an exemplary embodiment of the present invention, although other methods of communicating event information may be employed, including as the query string, visible fields and other attributes of the client's request.

In an alternative embodiment, the postback input may be transmitted in the form data of the HTTP request, without being recorded into hidden fields in the HTTP request by a client-side script (e.g., operations 704 and 706 may be bypassed). Instead, a standard "submit" command cause an HTTP "post" method, inserting into the form data one or more key-value pairs corresponding to properties of client-side user interface elements.

Even if the client-side event is related to an eventual postback event, the client-side event need not result in a postback event. Referring to decision operation 708, if the client-side event handler does not result in a submit( ) call, processing returns to waiting operation 700 to wait for another client-side event. Otherwise, processing proceeds to submitting operation 710 where postback data and events are combined into the payload of an HTTP request and transmitted to the web server. After the web server has completed processing the HTTP request, it sends an HTTP response with freshly rendered authoring language data (received in receiving operation 712) for display in a web page on the client in displaying operation 714.

Figure 8:
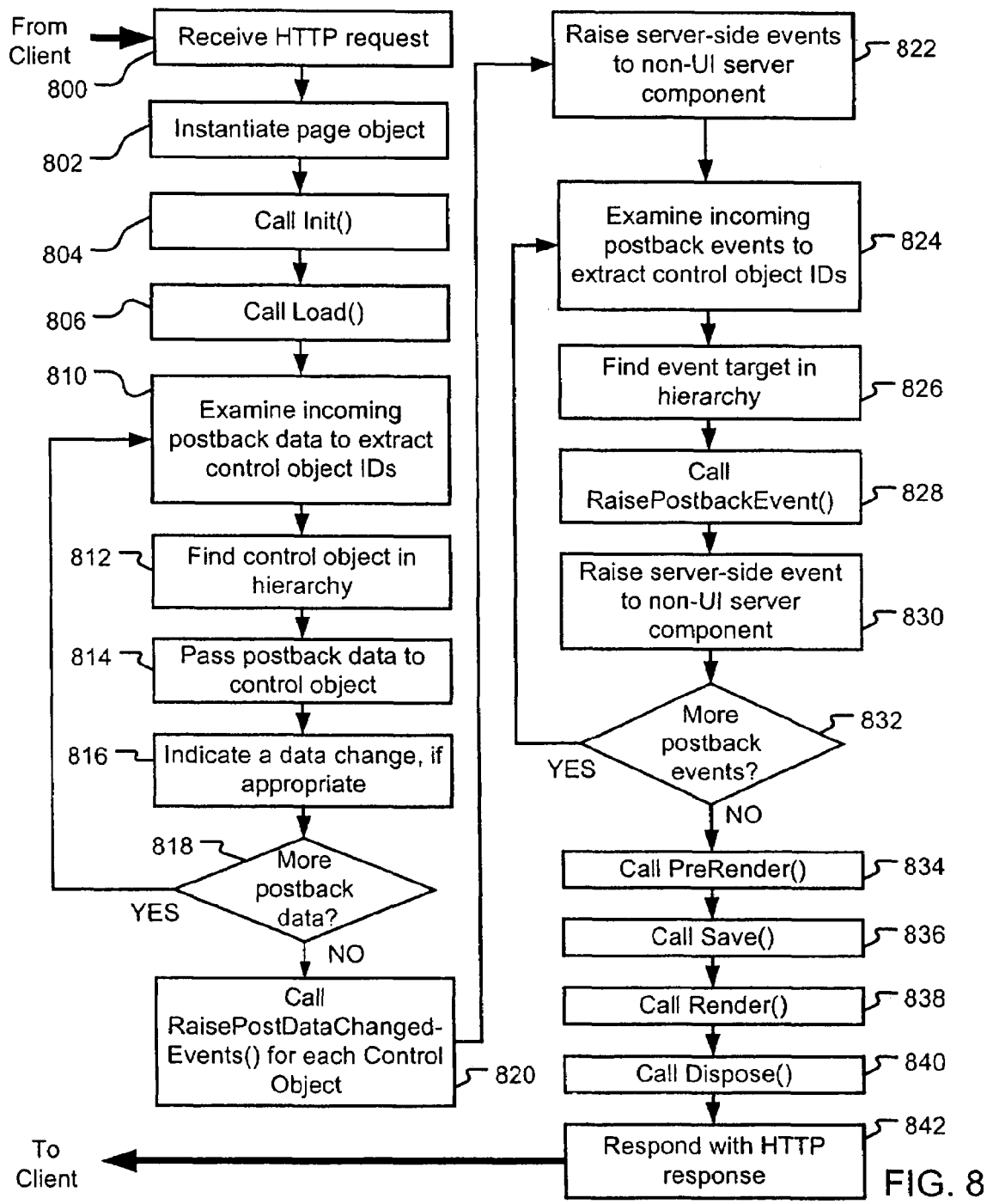
FIG. 8 illustrates a flow diagram of server-side operations for processing postback input in an embodiment of the present invention.

FIG. 8 illustrates a flow diagram of server-side operations for processing postback input in an embodiment of the present invention. In receiving operation 800, the web server receives the HTTP request transmitted from the client in submitting operation 710 of FIG. 7. A creating operation 802 instantiates the appropriate page object associated with the resource specified in the URL of the HTTP request.

In an embodiment of the present invention, the creating operation 802 also results in the creation of all other server-side control objects in the control object hierarchy. In another embodiment, the page object is created in the creating operation 802, while descendant control objects are created only when needed to perform a subsequent operation. The latter is referred to as "deferred control object creation".

In initiating operation 804, one or more server-side control objects are initiated using a call to the "Init( )" method. In operation 806, the state of one or more control objects, as received in an HTTP request containing a transportable state structure, is loaded into one or more server-side control objects to restore the control objects to their previous state. More details on the transportable state structure can be found in previously incorporated U.S. patent application Ser. No. 09/574,144 entitled STATE MANAGEMENT OF SERVER-SIDE CONTROL OBJECTS.

Examining operation 810 examines the incoming postback data in the HTTP request to find and extract identifiers ("IDs") corresponding to server-side control objects in the control object hierarchy. An identifier is generally found as a key in a key-value pair in the form data section of the HTTP request. Locating operation 812, having found a server-side control object ID, attempts to locate the corresponding server-side control object within the hierarchy. Locating operation 812 is described in more detail with regard to FIG. 9. Having found the corresponding server-side control object, loading operation 814 passes the associated postback data into the located server-side object. If loading operation 814 results in a change to the data previously stored in the server-side control object (i.e., previous data), data change operation 816 indicates a data change associated with the server-side control object. In an embodiment of the present invention, the previous data stored by the server-side control object is compared with the postback data to be stored, and, if the postback data differs from the previous data, a data change is indicated and the previous data is replaced with the postback data in the server-side control object. Alternative methods of indicating a data change and replacing the previous data with the postback data are also contemplated in the scope of the present invention.

In an embodiment of the present invention, a data change indication is performed by recording in a list an identifier of the control object for which the data change was detected. The data change indications may stored in an array or linked list, although other storage configurations are contemplated within the scope of the present invention. Decision operation 818 directs processing to the examining operation 810 if more postback data is available. In this manner, the actual raising of the data change events is deferred until postback data for other control objects has been input and the data change indication for such control objects is recorded into the list. After no other postback data remains to be processed, decision operation 818 directs processing to raise event operation 820 to ensure that the control objects in the hierarchy are in a stable state before individual data change events are raised.

The calling operation 820 calls a method to raise a server-side data change event for each control object associated with an indication of a data change. In event-raising operation 822, the server-side events are raised to server-side code that calls a method of an non-user-interface server component associated with the dynamic content resource. As such, data change events on a web page can be detected on the server to trigger various server-side data change events. These server-side events can then be detected by server-side code that can cause various processing tasks, such as updating orders in a customer database, etc. For example, a data change event may be raised to server-side code that calls a method of an e-commerce application to indicate a change in a consumer's selection in an online shopping web page.

After postback data has been processed in operations 810 through 822, postback events are processed in operations 824 through 832. Examining operation 824 examines the received HTTP request to locate and extract IDs for server-side control objects within the control object hierarchy. Locating operation 826 finds the control object that is the event target in the control object hierarchy. More details of locating operation 826 are shown with regard to FIG. 9. Calling operation 828 calls a method in the located control object to raise a server-side event. Also, the calling operation 828 may pass the event argument to the called method.

Event-raising operation 830 raises a server side event to server-side code in response to the call of calling operation 828. The server-side code can then call a method of a non-user-interface server component in response to the raised event. Furthermore, the server side code can interpret or filter raw event data received from the client and pass only the relevant data to the non-user-interface server component. For example, if a user clicks on an client-side image element, the postback event contains information including the X and Y coordinates of a user's click. The coordinates are stored as properties in the corresponding server-side control object of the image. In response to the raising of the click event on the server, the server-side code can extract the X and Y properties from the server-side control object and pass them to the non-user-interface component. As such, the developer of the non-user-interface component need not program the code required to extract the needed coordinates from the server-side control object.

Decision operation 832 directs processing to examining operation 824 if more postback events are included in the HTTP request. Otherwise, processing proceeds to calling operation 834 where a PreRender( ) method is called to invoke any other processing that is to occur before the generation of authoring language data. Calling operation 836 calls a Save( ) method to save the current state of control objects in the control object hierarchy. Calling operation 838 calls a Render( ) to generate authoring language data used to display a web page on the client. Calling operation 840 calls a Dispose( ) method. Responding operation 842 generates an HTTP response for communication to the client.

Figure 9:
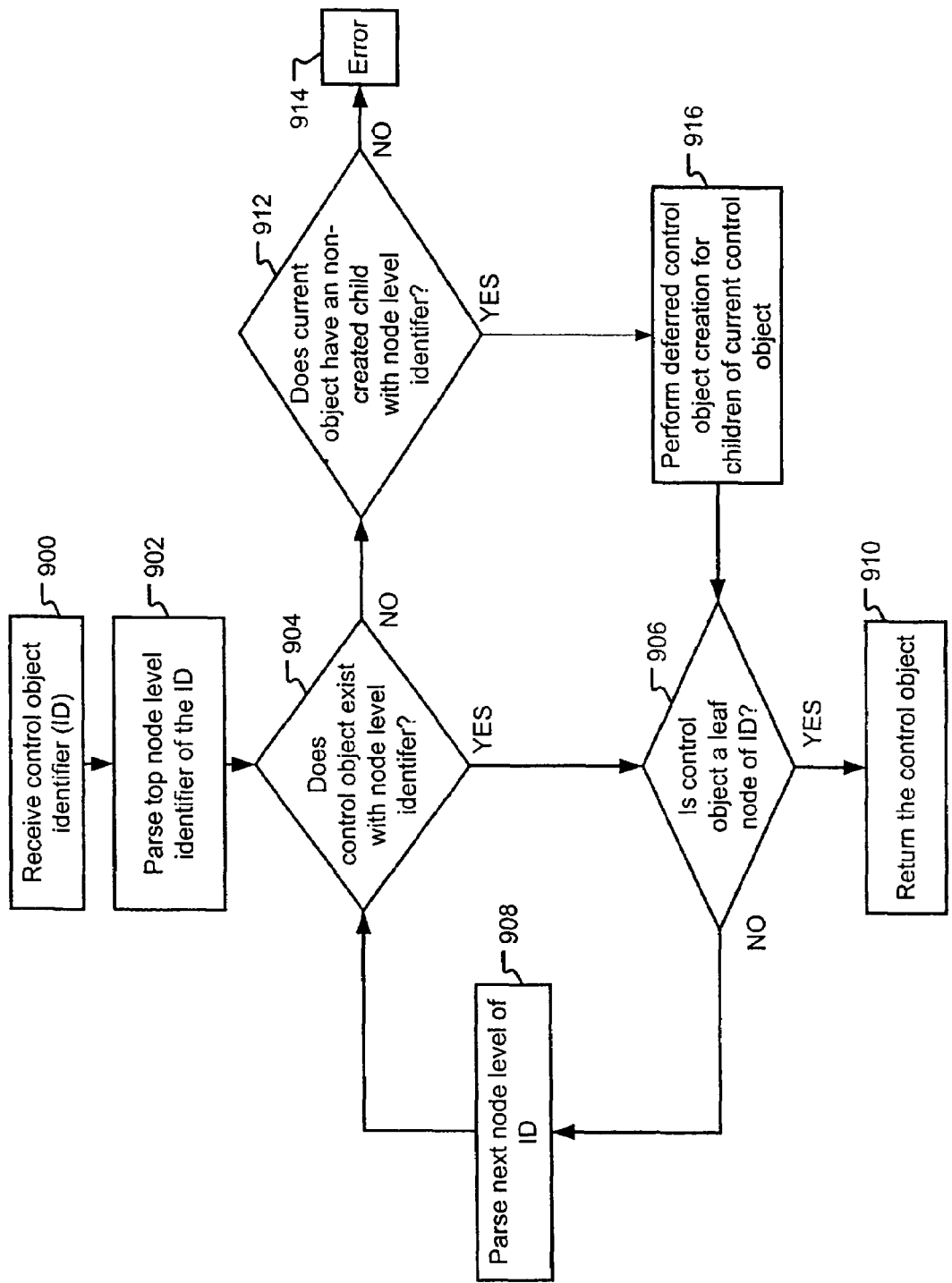
FIG. 9 illustrates a flow diagram of server-side operations for locating a control object in a control object hierarchy, responsive to a receipt of a control object path identifier, in an embodiment of the present invention.

FIG. 9 illustrates a flow diagram of server-side operations for locating a server-side control object in a control object hierarchy, in response to a receipt of a control object hierarchical identifier ("ID"), in an embodiment of the present invention. Receiving operation 900 receives an ID, which was received in an HTTP request from a client. In an embodiment of the present invention, the ID has a hierarchical naming structure (e.g., as a hierarchical path) to uniquely identify individual control objects within the control object hierarchy. Each level of the identifier is referred to as a "node level identifier". The lowest level of an ID identifies a control object that is a leaf node of the ID. For example, given an ID of "/Page1/List2/ListRow1", the top node level identifier of the ID is "Page1", "List2" and "ListRow1" are node level identifiers, and "ListRow1" represents a leaf node of the ID.

Reading operation 902 parses the top node level identifier of the ID. Decision operation 904 determines whether a control object exists with the parsed node level identifier. If so, decision operation 906 detects whether the current control object is a leaf node of the ID. If the current control object is not a leaf node of the ID, reading operation 908 parses the next level of the ID and processing proceeds to decision operation 904. Otherwise, if the control object is a leaf node of the ID, returning operation 910 returns the control object for use in processing given postback data or a given postback event.

If decision operation 904 does not locate a control object that exists (i.e., is already created) with the current node level identifier, decision operation 912 determines whether the current object possesses a non-created child corresponding to the node level identifier. If not, an error is issued in error operation 914 because the ID did not correspond to any existing or prospective control object in the control object hierarchy. Otherwise, deferred creation operation 916 creates non-created children of the current control object, resulting in "deferred control object creation". Processing then proceeds to returning operation 906.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer readable media, embodied in at least one tangible media, having a method executable by a computer system for processing postback input received from a client and associated with a client-side user interface element, the method comprising:

creating a plurality of server-side control objects in a server-side control object hierarchy, the server-side control object hierarchy including a target server-side control object associated with the client-side user interface element;

passing the postback input to the target server-side control object;

processing the postback input received by target server-side control object; and generating authoring language data from the plurality of server-side control objects to define a web page for display on a client.

2. The computer readable media of claim 1, wherein the method further comprises:
   receiving an identifier associated with the target server-side control object; and
   identifying the target server-side control object within the server-side control object hierarchy, based on the identifier.

3. The computer readable media of claim 1, wherein the method further comprises:
   terminating the plurality of server side control objects, after the operation of generating authoring language data.

4. A computer program storage medium readable by a computer system and encoding a computer program for executing a computer process performing server-side processing of postback input received from a client and associated with a client-side user interface element, the computer process comprising:
   examining the postback input received from the client to determine a hierarchical identifier of a target server-side control object in a server-side control hierarchy;
   identifying the target server-side control object in the server-side control hierarchy based on the hierarchical identifier of the target server-side control object
   passing the postback input received from the client to the target server-side control object; and
   processing the postback input received from the client and passed to the target server-side control object.

5. The computer program storage medium of claim 4 wherein the processing operation comprises changing a property of the target server-side control object; and further comprising:
   generating authoring language data from the target server-side control object based on the property to define the client-side user interface element for transmission to the client.

6. The computer program storage medium of claim 5 wherein the postback input is received in a current round trip session, and further comprising:
   creating a plurality of server-side control objects in a server-side control hierarchy, responsive to receipt of the postback input for the current round trip session; and;
   terminating the plurality of server-side control objects, prior to receipt of other postback input in a subsequent round trip session.

7. The computer program storage medium of claim 5 further comprising:
   searching for the target server-side control object in a server-side control hierarchy based on the identifier;
   creating the target server-side control object in the server-side control hierarchy, if the target server-side control object is not found by the searching operation; and
   terminating the server-side control hierarchy, after the operation of generating authoring language data.

8. The computer program storage medium of claim 4 wherein the hierarchical identifier has a hierarchical identifier structure indicating a plurality of levels in a server-side control hierarchy including a plurality of member server-side control objects, and the operation of identifying the target server-side control object comprises:
   extracting a node level identifier from the hierarchical identifier;
   passing the node level identifier to a member server-side control object corresponding to the node level identifier;
   identifying the member server-side control object as the target server-side control object, if the node level identifier identifies a leaf node of the hierarchical identifier;
   extracting a next node level identifier from the hierarchical identifier of the target server-side control object, if the node level identifier does not identify a leaf node of the hierarchical identifier, wherein the next node level identifier identifies a child server-side control object of the member server-side control object; and
   performing recursively the passing and identifying operations and the operation of extracting a next node level identifier using the next node level identifier as the node level identifier and the child server-side control object as the member server-side control object, if the node level identifier does not identify a leaf node of the hierarchical identifier.

9. The computer program storage medium of claim 4 wherein the operation of processing the postback input comprises:
   storing a postback data value as a property of the target server-side control object.

10. The computer program storage medium of claim 9 wherein the target server-side control object initially stores an old data value as a property, and the operation of storing a postback data value comprises:
    associating the postback data value with the property;
    indicating a data change associated with the target server-side control object, if the postback data value passed to the target server-side control object is different than the old data value of target server-side control object; and
    replacing the old data value with the postback data value in the target server-side control object.

11. The computer program storage medium of claim 10 further comprising:
    raising a server-side data change event after the operation of replacing of the old data value, if a data change is indicated.

12. The method of claim 9 wherein the target server-side control object is one of a plurality of member server-side control objects in a server-side control hierarchy, and the operation of storing a postback data value comprises:
    storing postback data values for all of the member server-side control objects in the server side control hierarchy; and
    raising at least one server-side data change event after the operation of storing a postback data value for all member server-side control objects, if at least one data change is indicated.

13. The computer program storage medium of claim 12 further comprising:
    receiving the server-side data change event from the target server-side control object; and
    invoking a function of a non-sure-interface server component, based on the server-side data change event.

14. The computer program storage medium of claim 4 wherein the operation of processing the postback input comprises:
    processing a postback event using the target server-side control object.

15. The computer program storage medium of claim 14 wherein the operation of processing a postback event comprises:
    extracting from the postback input a postback even argument associated with the identifier;
    passing the postback event argument associated with the identifier to the target server-side control object; and
    processing the postback event argument using the target server-side control object.

* * * * *